(12) United States Patent
Fitzsimmons et al.

(10) Patent No.: US 12,067,551 B2
(45) Date of Patent: Aug. 20, 2024

(54) METHODS, SYSTEMS, APPARATUSES, AND NON-TRANSITORY COMPUTER READABLE MEDIA FOR VALIDATING ENCODED INFORMATION

(71) Applicant: Altria Client Services LLC, Richmond, VA (US)

(72) Inventors: Michael Fitzsimmons, Richmond, VA (US); William M. Houston, Midlothian, VA (US)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 39 days.

(21) Appl. No.: 17/567,355

(22) Filed: Jan. 3, 2022

(65) Prior Publication Data
US 2022/0129878 A1 Apr. 28, 2022

Related U.S. Application Data

(63) Continuation of application No. 16/752,752, filed on Jan. 27, 2020, now Pat. No. 11,216,796, which is a (Continued)

(51) Int. Cl.
*G06Q 20/20* (2012.01)
*G07G 1/00* (2006.01)
(Continued)

(52) U.S. Cl.
CPC ......... *G06Q 20/208* (2013.01); *G07G 1/0009* (2013.01); *G07G 1/0045* (2013.01);
(Continued)

(58) Field of Classification Search
CPC .. G06Q 20/208; G07G 1/0009; G07G 1/0045; H04L 65/762; H04L 67/02; H04L 67/561; H04W 4/80
See application file for complete search history.

(56) References Cited

U.S. PATENT DOCUMENTS 4,723,212 A 2/1988 Mindrum et al.
4,990,756 A * 2/1991 Hoemann ............ G06K 7/0008
235/462.15
(Continued)

FOREIGN PATENT DOCUMENTS

CA 2304632 A1 * 4/1999
CN 101067883 A * 11/2007
(Continued)

OTHER PUBLICATIONS

Kwok, S.K et al. "A Counterfeit Network Analyzer Based on RFID and EPC." Industrial management + data systems 110.7 (2010): 1018-1037. Web. (Year: 2010).*
(Continued)

*Primary Examiner* — Ashford S Hayles
(74) *Attorney, Agent, or Firm* — Harness, Dickey & Pierce, P.L.C.

(57) ABSTRACT

A method, system and/or device for validating encoded information, the validation device including a memory having computer readable instructions stored thereon and a database including a plurality of validation rules, and at least one processor configured to execute the computer readable instructions to receive formatted data from at least one formatting device, extract attributes associated with encoded information from the formatted data, the extracted attributes including at least one of a formatting device identifier, a store identifier, value information from the encoded information, and time information, validate the formatted data based on the extracted attributes and the plurality of validation rules, store the results of the validation and at least a subset of the extracted attributes in the database, generate modified formatted data compatible with a POS terminal based on the results of the validation, and transmit the
(Continued)

modified formatted data to the at least one of formatting device.

20 Claims, 12 Drawing Sheets

Related U.S. Application Data continuation of application No. 16/526,378, filed on Jul. 30, 2019, now Pat. No. 10,558,966, which is a continuation of application No. 15/193,626, filed on Jun. 27, 2016, now Pat. No. 10,395,231.

(51) Int. Cl.
| | | |
|---|---|---|
| *H04L 65/75* | (2022.01) | |
| *H04L 67/02* | (2022.01) | |
| *H04L 67/561* | (2022.01) | |
| *H04W 4/80* | (2018.01) | |

(52) U.S. Cl.
CPC ............ *H04L 65/762* (2022.05); *H04L 67/02* (2013.01); *H04L 67/561* (2022.05); *H04W 4/80* (2018.02)

(56) References Cited

U.S. PATENT DOCUMENTS

| | | | |
|---|---|---|---|
| 5,091,634 A | 2/1992 | Finch et al. | |
| 5,386,369 A * | 1/1995 | Christiano | G06F 21/123 705/400 |
| 5,406,269 A * | 4/1995 | Baran | H04M 11/002 379/106.01 |
| 5,602,377 A * | 2/1997 | Beller | G06K 17/00 235/432 |
| 5,895,073 A * | 4/1999 | Moore | G09F 3/00 283/67 |
| 5,982,891 A * | 11/1999 | Ginter | H04N 21/44204 375/E7.009 |
| 6,110,044 A * | 8/2000 | Stern | G07F 17/32 463/16 |
| 6,820,065 B1 * | 11/2004 | Naclerio | G07B 17/0008 705/401 |
| 6,877,665 B2 * | 4/2005 | Challa | G06Q 20/04 235/462.46 |
| 6,996,543 B1 * | 2/2006 | Coppersmith | G09C 5/00 713/168 |
| 7,270,276 B2 * | 9/2007 | Vayssiere | G06Q 20/3278 235/492 |
| 7,283,630 B1 * | 10/2007 | Doljack | G06Q 10/087 705/28 |
| 7,318,551 B1 * | 1/2008 | Mills | G06K 7/10 235/441 |
| 7,364,074 B2 * | 4/2008 | He | G06Q 10/087 235/462.34 |
| 7,546,949 B1 * | 6/2009 | Blanford | G06K 17/0022 235/462.07 |
| 7,581,242 B1 * | 8/2009 | Oget | G06K 5/00 726/16 |
| 7,647,407 B2 * | 1/2010 | Omshehe | G06F 21/105 709/227 |
| 7,698,431 B1 | 4/2010 | Hughes | |
| 7,978,077 B2 * | 7/2011 | Lee | H04B 5/48 340/572.1 |
| 8,027,634 B1 * | 9/2011 | Warner | H04H 60/23 340/568.1 |
| 8,049,594 B1 * | 11/2011 | Baranowski | H04Q 9/3271 340/572.1 |
| 8,249,350 B2 * | 8/2012 | Voloshynovskyy | G07D 7/005 713/176 |
| 8,281,994 B1 * | 10/2012 | Wass | G16H 40/20 235/385 |
| 8,430,300 B2 | 4/2013 | Slavin et al. | |
| 8,444,048 B1 * | 5/2013 | Nidamarthi | G06Q 30/016 235/375 |
| 8,827,157 B1 * | 9/2014 | Foster | G06K 7/1095 235/375 |
| 8,866,596 B1 * | 10/2014 | Diorio | G06K 7/10366 713/176 |
| 9,002,727 B2 * | 4/2015 | Horowitz | G06Q 20/3276 705/14.69 |
| 9,202,329 B2 * | 12/2015 | Tymm | G06Q 20/06 |
| 9,225,519 B1 * | 12/2015 | Fraccaroli | H04W 12/64 |
| 9,262,633 B1 | 2/2016 | Todeschini et al. | |
| 9,405,945 B1 * | 8/2016 | Diorio | G06K 7/10227 |
| 9,607,286 B1 * | 3/2017 | Diorio | G06K 19/07758 |
| 9,699,004 B2 * | 7/2017 | Pierce | G06K 7/0017 |
| 9,881,433 B2 * | 1/2018 | Bergdale | G07C 9/27 |
| 10,019,567 B1 * | 7/2018 | Allen | G06F 21/46 |
| 10,552,861 B2 * | 2/2020 | Nordstrand | G06Q 30/0222 |
| 11,080,739 B2 * | 8/2021 | Setchell | G06Q 30/06 |
| 2002/0004767 A1 * | 1/2002 | Okamoto | G06K 17/00 705/28 |
| 2002/0107806 A1 * | 8/2002 | Higashi | G06F 21/105 705/51 |
| 2002/0128976 A1 * | 9/2002 | O'Connor | G06Q 20/367 705/65 |
| 2003/0061165 A1 * | 3/2003 | Okamoto | G06F 21/10 705/52 |
| 2003/0074259 A1 | 4/2003 | Slyman et al. | |
| 2003/0078891 A1 * | 4/2003 | Capitant | H04N 21/4627 348/E7.056 |
| 2003/0152229 A1 | 8/2003 | Entani | |
| 2003/0174728 A1 | 9/2003 | Kamiya et al. | |
| 2003/0204442 A1 * | 10/2003 | Marshall | G06Q 30/02 235/462.43 |
| 2004/0076294 A1 * | 4/2004 | Shibata | G11B 20/00086 380/201 |
| 2004/0140361 A1 * | 7/2004 | Paul | G06Q 20/357 235/462.45 |
| 2004/0154004 A1 | 8/2004 | Maine | |
| 2004/0162828 A1 * | 8/2004 | Moyes | G07F 7/12 707/999.009 |
| 2004/0163051 A1 * | 8/2004 | Hepworth | G06F 9/5055 715/234 |
| 2004/0249712 A1 * | 12/2004 | Brown | G06Q 30/0217 705/14.19 |
| 2005/0007236 A1 * | 1/2005 | Lane | H04L 9/321 340/5.82 |
| 2005/0033643 A1 * | 2/2005 | Smith | G06Q 20/387 705/16 |
| 2005/0038756 A1 * | 2/2005 | Nagel | G06K 19/086 705/76 |
| 2005/0060233 A1 * | 3/2005 | Bonalle | G06Q 20/14 705/16 |
| 2005/0061875 A1 * | 3/2005 | Zai | G07F 7/1008 235/383 |
| 2005/0092839 A1 * | 5/2005 | Oram | G07D 7/0043 235/462.13 |
| 2005/0108044 A1 * | 5/2005 | Koster | G16H 20/13 705/2 |
| 2005/0247778 A1 * | 11/2005 | Roberts | G07G 1/0045 235/383 |
| 2005/0273434 A1 * | 12/2005 | Lubow | G06Q 10/087 705/59 |
| 2005/0289083 A1 * | 12/2005 | Ngai | H04L 9/3247 705/67 |
| 2005/0289139 A1 * | 12/2005 | Takashima | G11B 20/00086 707/999.005 |
| 2006/0047570 A1 * | 3/2006 | Lenderking | G06Q 30/0238 705/14.35 |
| 2006/0054682 A1 * | 3/2006 | de la Huerga | G16H 20/10 235/375 |
| 2006/0065741 A1 * | 3/2006 | Vayssiere | G06Q 20/341 235/492 |
| 2006/0069654 A1 | 3/2006 | Beach et al. | |
| 2006/0086791 A1 * | 4/2006 | Austin | G06K 19/14 235/385 |

(56) References Cited

U.S. PATENT DOCUMENTS

| | | | |
|---|---|---|---|
| 2006/0091208 A1* | 5/2006 | He | G06Q 10/087 235/385 |
| 2006/0265281 A1* | 11/2006 | Sprovieri | G06Q 30/0236 705/14.36 |
| 2007/0040684 A1* | 2/2007 | McAllister | B65C 9/1865 340/572.1 |
| 2007/0043633 A1* | 2/2007 | Balinsky | G06Q 10/087 705/28 |
| 2007/0075832 A1* | 4/2007 | Morse | G06K 7/10326 340/10.1 |
| 2007/0125836 A1* | 6/2007 | McAllister | G06K 19/07716 340/572.1 |
| 2007/0255965 A1* | 11/2007 | McGucken | G06Q 30/08 713/193 |
| 2008/0002882 A1* | 1/2008 | Voloshynovskyy | G07D 7/005 380/201 |
| 2008/0046114 A1* | 2/2008 | White | G06Q 30/06 700/215 |
| 2008/0065490 A1* | 3/2008 | Novick | G06Q 30/0225 705/14.39 |
| 2008/0065496 A1* | 3/2008 | Fowler | G07G 1/009 705/16 |
| 2008/0084866 A1 | 4/2008 | Johnson et al. | |
| 2008/0093456 A1* | 4/2008 | Pasik | G06K 17/0022 235/462.15 |
| 2008/0116271 A1* | 5/2008 | Holz | G06K 7/0004 235/435 |
| 2008/0128492 A1* | 6/2008 | Roth | G06Q 30/018 235/380 |
| 2008/0167991 A1* | 7/2008 | Carlson | G06Q 30/0215 705/50 |
| 2008/0191909 A1* | 8/2008 | Mak | B64F 1/368 341/95 |
| 2008/0195546 A1* | 8/2008 | Lilley | G06Q 30/0256 705/14.54 |
| 2008/0222042 A1* | 9/2008 | Moore | G16H 20/10 235/375 |
| 2008/0228513 A1* | 9/2008 | McMillan | G06F 21/105 726/2 |
| 2009/0008450 A1* | 1/2009 | Ebert | G06Q 10/08 235/439 |
| 2009/0018908 A1* | 1/2009 | Dersovitz | G06Q 30/02 705/14.39 |
| 2009/0031141 A1* | 1/2009 | Pearson | G06F 21/57 713/187 |
| 2009/0045955 A1* | 2/2009 | Ulrich | G08B 13/2482 340/572.1 |
| 2009/0077645 A1* | 3/2009 | Kottahachchi | G06F 21/33 726/9 |
| 2009/0089111 A1* | 4/2009 | Walker | G06Q 30/02 705/7.29 |
| 2009/0112101 A1* | 4/2009 | Furness, III | G01J 3/0264 356/71 |
| 2009/0126028 A1 | 5/2009 | Traenkenschuh et al. | |
| 2009/0144164 A1* | 6/2009 | Wane | G06Q 20/10 235/383 |
| 2009/0171903 A1 | 7/2009 | Lin et al. | |
| 2009/0198541 A1* | 8/2009 | Dolan | G06Q 10/087 705/29 |
| 2009/0218391 A1* | 9/2009 | He | G06Q 10/06 235/375 |
| 2009/0293112 A1* | 11/2009 | Moore | H04L 9/3234 726/9 |
| 2010/0019026 A1* | 1/2010 | Hochfield | G06Q 10/08 235/375 |
| 2010/0044438 A1* | 2/2010 | Chen | G09F 3/0292 235/462.01 |
| 2010/0079254 A1* | 4/2010 | Koo | G06K 7/10198 340/10.3 |
| 2010/0088166 A1* | 4/2010 | Tollinger | G06Q 20/387 705/14.13 |
| 2010/0138351 A1* | 6/2010 | Gilliam | G06Q 50/184 705/310 |
| 2011/0029546 A1 | 2/2011 | Mineno et al. | |
| 2011/0047019 A1* | 2/2011 | Cervenka | G06Q 30/0225 705/14.26 |
| 2011/0082731 A1* | 4/2011 | Kepecs | G06Q 30/02 235/487 |
| 2011/0107100 A1* | 5/2011 | Loken | H04L 9/3236 713/170 |
| 2011/0211727 A1* | 9/2011 | Costa | G06F 21/35 382/100 |
| 2011/0213652 A1* | 9/2011 | Gillen | G06Q 30/0239 705/14.39 |
| 2011/0213721 A1* | 9/2011 | Raley | G06F 21/10 705/310 |
| 2011/0241838 A1* | 10/2011 | Wischmeyer | G06F 21/35 340/10.1 |
| 2011/0246284 A1 | 10/2011 | Chaikin et al. | |
| 2011/0255690 A1* | 10/2011 | Kocher | H04L 9/3249 380/210 |
| 2011/0258924 A1* | 10/2011 | Van Asbrouck | G06K 19/06009 235/487 |
| 2011/0276371 A1* | 11/2011 | Norcross | G06Q 30/0207 705/14.1 |
| 2011/0290884 A1* | 12/2011 | Cai | G06K 7/10851 235/462.15 |
| 2011/0302017 A1 | 12/2011 | Marti et al. | |
| 2011/0302018 A1* | 12/2011 | Norcross | G06Q 30/0225 705/14.26 |
| 2012/0013448 A1* | 1/2012 | Baranowski | H04L 9/3271 340/10.52 |
| 2012/0111939 A1* | 5/2012 | Silverbrook | G06Q 20/3674 235/380 |
| 2012/0136707 A1* | 5/2012 | Chang | G06Q 30/0222 705/14.23 |
| 2012/0158469 A1* | 6/2012 | Brewer | G06Q 30/0207 705/14.1 |
| 2012/0179517 A1* | 7/2012 | Tang | G06Q 30/0185 705/318 |
| 2012/0179531 A1* | 7/2012 | Kim | G06Q 30/0225 705/26.1 |
| 2012/0179615 A1* | 7/2012 | Tang | G06Q 30/0185 705/318 |
| 2012/0209630 A1* | 8/2012 | Ihm | G06Q 20/3274 705/14.23 |
| 2012/0211555 A1* | 8/2012 | Rowe | G06K 7/1404 235/375 |
| 2012/0234908 A1* | 9/2012 | Wang | H04L 9/3268 235/375 |
| 2012/0259715 A1 | 10/2012 | Robson et al. | |
| 2012/0265988 A1* | 10/2012 | Ehrensvard | H04L 63/0435 713/165 |
| 2012/0271697 A1 | 10/2012 | Gilman et al. | |
| 2012/0284311 A1 | 11/2012 | Mineno et al. | |
| 2012/0316949 A1 | 12/2012 | Chen | |
| 2013/0079037 A1 | 3/2013 | Dobyns | |
| 2013/0085827 A1 | 4/2013 | Jenkins | |
| 2013/0091002 A1 | 4/2013 | Christie et al. | |
| 2013/0097085 A1* | 4/2013 | Peckover | G06F 21/73 705/50 |
| 2013/0132218 A1* | 5/2013 | Aihara | G07G 1/0081 705/21 |
| 2013/0194097 A1* | 8/2013 | Joseph | G08B 13/2417 340/572.1 |
| 2013/0204690 A1* | 8/2013 | Liebmann | G06Q 30/0225 705/14.26 |
| 2013/0275197 A1 | 10/2013 | Thibedeau et al. | |
| 2013/0278425 A1* | 10/2013 | Cunningham | G08B 13/246 340/572.1 |
| 2013/0282462 A1* | 10/2013 | Xu | G06Q 30/0251 705/14.26 |
| 2013/0304712 A1* | 11/2013 | Meijer | H04N 21/80 707/694 |
| 2013/0341400 A1 | 12/2013 | Lancaster-Larocque | |

(56) References Cited

U.S. PATENT DOCUMENTS

| | | | |
|---|---|---|---|
| 2014/0095398 A1* | 4/2014 | Lin | G06Q 30/0185 |
| | | | 705/318 |
| 2014/0101063 A1* | 4/2014 | Paul | G06Q 30/0185 |
| | | | 705/318 |
| 2014/0125800 A1* | 5/2014 | Van Nest | G07G 3/003 |
| | | | 340/572.3 |
| 2014/0149196 A1* | 5/2014 | Drozd | G06Q 20/20 |
| | | | 705/14.21 |
| 2014/0149197 A1 | 5/2014 | James et al. | |
| 2014/0175161 A1 | 6/2014 | Camp | |
| 2014/0201094 A1* | 7/2014 | Herrington | G06V 20/80 |
| | | | 705/317 |
| 2014/0222545 A1* | 8/2014 | Hajji | G06Q 20/20 |
| | | | 705/16 |
| 2014/0258046 A1* | 9/2014 | Wendling | G06Q 20/3278 |
| | | | 705/26.82 |
| 2014/0297441 A1 | 10/2014 | Thams et al. | |
| 2014/0297545 A1* | 10/2014 | Prasad | G06Q 30/0185 |
| | | | 705/318 |
| 2014/0304167 A1* | 10/2014 | Atkinson | G06K 19/10 |
| | | | 726/29 |
| 2015/0006914 A1* | 1/2015 | Oshida | G06F 21/10 |
| | | | 713/193 |
| 2015/0046240 A1 | 2/2015 | Moreton | |
| 2015/0066777 A1* | 3/2015 | Bateson | G06Q 30/012 |
| | | | 705/67 |
| 2015/0126110 A1 | 5/2015 | Ashley et al. | |
| 2015/0144689 A1* | 5/2015 | Cancro | G06Q 30/0623 |
| | | | 235/375 |
| 2015/0161329 A1 | 6/2015 | Mabotuwana et al. | |
| 2015/0161643 A1* | 6/2015 | Randell | G06Q 30/0235 |
| | | | 705/14.26 |
| 2015/0170164 A1* | 6/2015 | Marsico | G06Q 30/0201 |
| | | | 235/375 |
| 2015/0186913 A1* | 7/2015 | Mann | G06Q 30/0219 |
| | | | 705/14.21 |
| 2015/0213660 A1* | 7/2015 | Bergdale | G07C 9/21 |
| | | | 340/5.61 |
| 2015/0235235 A1* | 8/2015 | Koren | G06Q 30/0185 |
| | | | 705/318 |
| 2015/0242883 A1 | 8/2015 | Setchell et al. | |
| 2015/0261697 A1* | 9/2015 | Christian | G06F 13/107 |
| | | | 703/25 |
| 2015/0278753 A1* | 10/2015 | Hookom | G06K 7/1443 |
| | | | 235/385 |
| 2015/0287290 A1* | 10/2015 | Van Horn | G07G 1/0054 |
| | | | 705/23 |
| 2015/0302421 A1* | 10/2015 | Caton | G06K 19/06037 |
| | | | 705/17 |
| 2015/0310474 A1* | 10/2015 | Setchell | G06Q 20/3274 |
| | | | 235/462.25 |
| 2016/0012498 A1* | 1/2016 | Prasad | G06Q 30/0185 |
| | | | 705/26.1 |
| 2016/0027021 A1* | 1/2016 | Kerdemelidis | G06Q 30/018 |
| | | | 705/317 |
| 2016/0078422 A1* | 3/2016 | Holmes | G06Q 30/04 |
| | | | 705/17 |
| 2016/0092875 A1* | 3/2016 | Howe | G06Q 20/42 |
| | | | 705/44 |
| 2016/0117496 A1* | 4/2016 | Bielstein | A61N 1/3925 |
| | | | 607/5 |
| 2016/0117685 A1* | 4/2016 | Bassi | G06K 7/10297 |
| | | | 705/318 |
| 2016/0132704 A1* | 5/2016 | Engels | H04W 4/80 |
| | | | 340/10.42 |
| 2016/0140369 A1* | 5/2016 | Deal | G06F 1/266 |
| | | | 713/310 |
| 2016/0148241 A1* | 5/2016 | Walsh | G06Q 30/0238 |
| | | | 705/14.26 |
| 2016/0335655 A1* | 11/2016 | Hansen | G06Q 30/0233 |
| 2016/0342885 A1* | 11/2016 | Toedtli | G06K 7/1443 |
| 2017/0011407 A1* | 1/2017 | Schmitz | G06Q 30/0185 |
| 2017/0017707 A1 | 1/2017 | Kataoka et al. | |
| 2017/0032382 A1* | 2/2017 | Shulman | G06K 7/10861 |
| 2017/0075677 A1 | 3/2017 | Gross et al. | |
| 2017/0192723 A1* | 7/2017 | Ichikawa | H04W 12/50 |
| 2017/0329599 A1 | 11/2017 | Choi | |
| 2017/0372289 A1* | 12/2017 | Fitzsimmons | G07G 1/0009 |
| 2018/0167380 A1 | 6/2018 | Debickes et al. | |
| 2018/0268409 A1 | 9/2018 | Guo | |

FOREIGN PATENT DOCUMENTS

| | | | | |
|---|---|---|---|---|
| JP | 2003533763 A | * | 11/2003 | |
| WO | WO-2006041031 A1 | * | 4/2006 | G06F 21/10 |
| WO | WO-2012125897 A2 | * | 9/2012 | G06F 21/30 |
| WO | WO-2013117738 A1 | | 8/2013 | |
| WO | WO-2013121356 A2 | * | 8/2013 | G06F 19/3456 |
| WO | WO-2015039279 A1 | * | 3/2015 | G06F 21/33 |
| WO | WO-2015136419 A1 | * | 9/2015 | G06K 7/10366 |
| WO | WO-2015164255 A1 | | 10/2015 | |

OTHER PUBLICATIONS

Bala Krishna, M., and Arpit Dugar. "Product Authentication Using QR Codes: A Mobile Application to Combat Counterfeiting." Wireless personal communications 90.1 (2016): 381-398. Web. (Year: 2016).* www.web.archive.org/web/20150425214754/http://apps.miva.com/product/WCW-CPN5.html. "Coupon Redemption by Emporium Plus". Miva Inc. 2015.

http://couponsinthenews.com/2015/12/01/company-hopes-coupons-for-snacks-will-keep-em-smoking. "Company Hopes Coupons for Snacks Will Keep 'Em Smoking". Coupons in the News. Dec. 1, 2015.

www.qr2coupon.net/en/how_to/integrate_in_POS. "Integrate in POS—Manage Discount Easily. Redeem Bar Codes for Any Item". QR2Coupon.

http://www.csnews.com/product-categories/tobacco/reynolds-pilots-retail-technology-program?page=0%2C1. "R.J. Reynolds Pilots Retail Technology Program—Spot You More system delivers digital coupons and promotions with ease". Convenience Store News. Nov. 18, 2015.

Patil, Vishwas, and R K Shyamasundar. "e-Coupons: An Efficient, Secure and Delegable Micro-Payment System." Information systems frontiers 7.4 (2005): 371-389. Web. (Year: 2005).

Pathath, Ram Shasank. "Coupon Redemption System." ProQuest Dissertations Publishing, 2016. Print. (Year: 2016).

* cited by examiner

METHODS, SYSTEMS, APPARATUSES, AND NON-TRANSITORY COMPUTER READABLE MEDIA FOR VALIDATING ENCODED INFORMATION

CROSS-REFERENCE

This application is a continuation application of U.S. application Ser. No. 16/752,752, filed on Jan. 27, 2020, which is a continuation application of U.S. application Ser. No. 16/526,378, filed on Jul. 30, 2019, which is a continuation application of U.S. application Ser. No. 15/193,626, filed on Jun. 27, 2016, the entire contents of each of which are hereby incorporated by reference.

BACKGROUND

Field

The present disclosure relates to methods, systems, apparatuses and/or non-transitory computer readable media for validating coded information, and more specifically to systems and apparatuses for formatting and/or validating encoded information, and methods and non-transitory computer readable media for validating the same.

Description

Various techniques currently exist for encoding and/or validating coded information. Coded information may be used to express various types of information for use in many different types of applications, such as data gathering applications, real-time tracking applications, transmittal of information to stand alone electronic appliance applications, etc. While there is a great range of applications that encoded information may be used with, and great utility may be derived from the use of encoded information, one particular challenge faced with the use of a new encoded information system is generating wide adoption of the new encoded information system by various stakeholders/actors. More particularly, some of the issues that prohibit and/or decrease the adoption of a new encoded information system are directly caused by the expense and inconvenience of having to acquire and install new hardware elements compatible with the new encoded information system and/or upgrading existing hardware elements to be compatible with the new encoded information system. Another issue inhibiting the adoption of new encoded information systems pertains to issues where pre-existing hardware systems for validating encoded information may use proprietary and/or customized hardware elements that have limited to no upgrade capability. For example, a pre-existing hardware system may not have sufficient memory capacity, processing capability, networking capability, etc., to support a new and/or updated encoded information system. This is particularly worrisome when a particular encoded information system requires new, additional, and/or updated security functionality, rule sets, procedures, etc., to account for or deter potential attacks, hacks, fraud, etc., from being performed on the hardware system. Therefore, there exists a demand for formatting and/or validating apparatuses, systems, methods, and non-transitory computer readable media that enable the upgrading of pre-existing encoded information systems to be compatible with new encoded information systems. There also exists a demand for formatting and/or validating apparatuses, systems, methods, and non-transitory computer readable media that may operate in conjunction with future encoded information hardware systems without requiring special modification and/or customization of the future encoded information hardware system.

SUMMARY

At least one example embodiment relates to a formatting device for validating encoded information. In at least one example embodiment, the formatting device includes an input-output (I/O) interface configured to receive encoded information from a connected scanning device, a memory having stored thereon computer readable instructions, and at least one processor configured to execute the computer readable instructions to format the received encoded information into formatted data compatible with a point-of-sale (POS) terminal, classify the formatted data into at least one classification layer of a plurality of classification layers in accordance with attributes associated with the received encoded information and a plurality of matching rules stored in the memory, determine a destination to transmit the formatted data based on the classification layer, the formatted data including metadata associated with the received encoded information and token information, and transmit the formatted data to the determined destination.

In at least one example embodiment, the determined destination may be at least one of a local rules server, the POS terminal, a cloud server, and at least one second formatting device.

Some example embodiments provide that the device may include a wireless transceiver configured to transmit the formatted data to the local rules server when the determined destination is the local rules server, and receive modified formatted data compatible with the POS terminal from the local rules server, the modified formatted data including a message indicating results of a validation determination performed by the local rules server and the attributes associated with the received encoded information, the validation determination indicating whether the attributes associated with the received encoded information are valid. The at least one processor may be further configured to transmit the modified formatted data to the POS terminal.

Some example embodiments provide that the POS terminal may be configured to extract the message and the attributes associated with the received encoded information from the modified formatted data, determine whether the attributes associated with the received encoded information is valid based on the extracted message, and process results of the determination.

Some example embodiments provide that the message may be one of at least a message indicating that the attributes associated with the received encoded information is valid, a message indicating that the attributes associated with the received encoded information is invalid, a message indicating that an error occurred, and a null message.

Some example embodiments provide that the wireless transmitter may be configured to connect to the local rules server over a Personal Area Network (PAN).

Some example embodiments provide that the I/O interface may be configured to transmit the received encoded information directly to the POS terminal if it is not in communication with a local rules server.

Some example embodiments provide that the POS terminal may be configured to provide power to the formatting device.

Some example embodiments provide that the encoded information may be an encrypted unique code that is displayed to the scanning device.

Some example embodiments provide that the plurality of classification layers may include a first classification layer associated with printed encoded information, a second classification layer associated with one-time use encoded information, and a third classification layer associated with a set of custom matching rules, the set of custom matching rules stored on the memory.

At least one example embodiment relates to a validation system for validating encoded information. In at least one example embodiment, the validation system includes at least one scanning device configured to read encoded information, at least one point-of-sale (POS) terminal, at least one local rules server configured to store a plurality of validation rules, and at least one formatting device, the device including an input-output (I/O) interface configured to receive the encoded information from the scanning device, a memory having stored thereon computer readable instructions, and at least one processor configured to format the received encoded information into formatted data compatible with the point-of-sale (POS) terminal, classify the formatted data into at least one classification layer of a plurality of classification layers in accordance with attributes associated with the received encoded information and a plurality of matching rules stored in the memory, determine a destination to transmit the formatted data based on the classification layer, the formatted data including metadata associated with the received encoded information and token information, and transmit the formatted data to the determined destination.

Some example embodiments provide that the at least one formatting device may include a plurality of formatting devices, and each of the plurality of formatting devices may include a wireless transceiver configured to transmit the formatted data to the local rules server when the determined destination is the local rules server, receive modified formatted data compatible with the POS terminal from the local rules server, and the modified formatted data including a message indicating results of a validation determination performed by the local rules server and the attributes associated with the received encoded information, the validation determination indicating whether the attributes associated with the received encoded information are valid. The at least one processor may be further configured to transmit the modified formatted data to the POS terminal.

Some example embodiments provide that the plurality of formatting devices may be configured to communicate via a personal area network (PAN).

Some example embodiments provide that the at least one local rules server may include a database storing the plurality of validation rules, the plurality of validation rules associated with a plurality of encoded information and validation state information regarding the plurality of encoded information. The local rules server may be configured to receive the formatted data from the at least one formatting device, extract the attributes associated with the received encoded information from the formatted data, the extracted attributes including at least one of a formatting device identifier, a store identifier, value information from the encoded information, and time information, validate the formatted data based on the extracted attributes and the plurality of validation rules, store the results of the validation and at least a subset of the extracted attributes in the database, generate the modified formatted data compatible with the POS terminal based on the results of the validation, and transmit the modified formatted data to the at least one of formatting device.

Some example embodiments provide that the system may further include a cloud server configured to transmit new validation rules to the local rules server database, and receive the results of the validation from the local rules server and the validation state information from the local rules server.

Some example embodiments provide that the cloud server may be configured to transmit software updates to the local rules server and receive hardware status information from the local rules server.

Some example embodiments provide that the local rules server may be configured to communicate with the cloud server over a network.

Some example embodiments provide that the local rules server may include a cellular transceiver configured to communicate with the cloud server over a cellular network.

Some example embodiments provide that the cloud server may be further configured to generate the encoded information using an encryption algorithm and the validation rules, the encoded information being an encrypted unique code.

At least one example embodiment relates to a method for validating encoded information. In at least one example embodiment, the method includes receiving, using at least one processor, encoded information from a scanning device, formatting, using the at least one processor, the received encoded information into formatted data compatible with a point-of-sale (POS) terminal, classifying, using the at least one processor, the formatted data into at least one classification layer of a plurality of classification layers in accordance with attributes associated with the received encoded information and a plurality of matching rules stored in memory of a formatting device, determining, using the at least one processor, a destination to transmit the formatted data based on the classification layer, the formatted data including metadata associated with the received encoded information and token information, and transmitting, using the processor, the formatted data to the determined destination.

In at least one example embodiment the method may further include transmitting, using the at least one processor, the formatted data to the local rules server based on the results of the determining, receiving, using the at least one processor, a modified formatted data compatible with the POS terminal from the local rules server, the modified formatted data including a message indicating results of a validation determination performed by the local rules server and the attributes associated with the received encoded information, the validation determination indicating whether the attributes associated with the received encoded information are valid, and transmitting, using the at least one processor, the modified formatted data to the POS terminal.

At least one example embodiment relates to a validation device. In at least one example embodiment, the validation device includes a memory having computer readable instructions stored thereon and a database that includes a plurality of validation rules, and at least one processor configured to execute the computer readable instructions to receive formatted data from at least one formatting device, extract attributes associated with encoded information from the formatted data, the extracted attributes including at least one of a formatting device identifier, a store identifier, value information from the encoded information, and time information, validate the formatted data based on the extracted attributes and the plurality of validation rules, store the results of the validation and at least a subset of the extracted attributes in the database, generate modified formatted data compatible with a POS terminal based on the results of the validation, and transmit the modified formatted data to the at least one of formatting device.

Some example embodiments provide that the validation device may include at least one transceiver configured to communicate with the at least one formatting device and a cloud server.

Some example embodiments provide that the at least one processor may be further configured to receive new validation rules from the cloud server, install the new validation rules on the database, and transmit at least one of the results of the validation, validation state information, and hardware status information to the cloud server.

Some example embodiments provide that the at least one processor may be further configured to receive software updates from the cloud server, determine whether to update software installed on the at least one formatting device based on the received software updates, and transmit the software updates to the at least one formatting device based on results of the determining.

Some example embodiments provide that the software updates may include at least one of software upgrades for the validation device, software upgrades for the at least one formatting device, and new custom matching rules for the at least one formatting device.

Some example embodiments provide that the at least one processor may be further configured to receive content from the cloud server, and transmit the content to at least one device, the device including at least one of a mobile device, the POS terminal, and an electronic display.

Some example embodiments provide that the content may be multimedia content.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
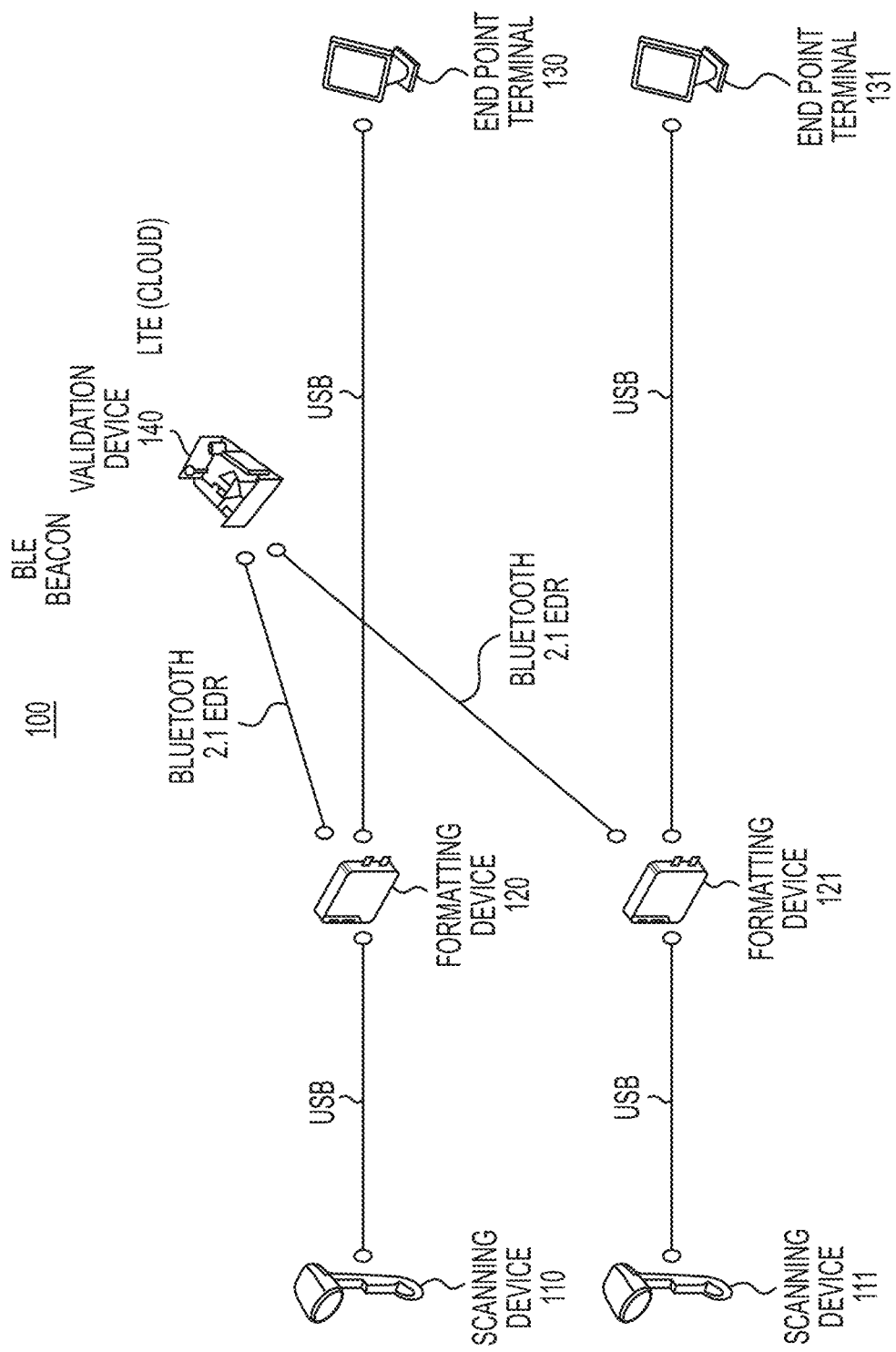
FIG. 1 illustrates a system for validating encoded information according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, regions, layers, and/or sections, these elements, regions, layers, and/or sections, should not be limited by these terms. These terms are only used to distinguish one element, region, layer, or section, from another region, layer, or section. Thus, a first element, region, layer, or section, discussed below may be termed a second element, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, and/or elements, but do not preclude the presence or addition of one or more other features, integers, steps, operations, elements, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, element, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or elements such as the described system, architecture, devices, circuit, and the like, may be connected or combined to be different from the above-described methods, or results may be appropriately achieved by other elements or equivalents.

FIG. 1 illustrates a system for formatting and validating encoded information according to at least one example embodiment. The validation system 100 includes one or more encoded information scanners (e.g., 110, 111), one or more formatting devices (e.g., 120, 121), one or more validation devices (e.g., 140), and one or more end point terminals (e.g., 130, 131). According to some example embodiments, the system may also include one or more servers (not shown), such as a cloud server, or platform server. While two encoded information scanners, two formatting devices, one validation device, and two end point terminals are illustrated in FIG. 1, the example embodiments are not limited thereto and there may be a greater or lesser number of each individual element in the system and/or other additional elements included in the system according to other example embodiments, such as a cloud server.

According to various example embodiments, the encoded information scanners and the end point terminals may be pre-existing conventional scanners and terminals that have been used for and/or are compatible with pre-existing and/or other encoded information systems. For example, the encoded information scanners 110, 111 may be barcode scanners, document scanners, cameras, video cameras, etc., that are used to capture information related to encoded information. The end point terminals 130, 131 may be Point-of-Sale (POS) terminals, computer terminals, servers, cash registers, OCR capable systems, electronic turnstiles, security checkpoints, etc., that are used to process and/or apply encoded information to provide a result (e.g., apply a discount to a purchase amount, allow/deny access to a secured location, etc.). The end point terminals may include a display device that may display the results of the encoded information validation, operator instructions related to the encoded information validation results, and/or other information to the end point terminal operator. Examples of an encoded information system include document verification systems (e.g., passport verification systems, driver's license verification systems, airline boarding pass verification systems, ticket verification systems, bank note verification systems, currency verification systems, other identity verification systems, etc.), point of sale systems (e.g., in-store POS systems, gift card systems, coupon validation systems, product purchasing systems, loyalty card systems, membership verification systems, etc.), item tracking systems (e.g., warehouse item tracking systems, shipping tracking systems, library book tracking systems, etc.), etc., but the example embodiments are not limited thereto and may be applicable to other uses as well. Examples of the encoded information include barcodes, quick response (QR) codes, holograms, unique alphanumeric identifiers, unique images/pictures, character/numeric text strings, unique audible signals, information encoded in magnetic strips, etc., but the example embodiments are not limited thereto.

For example, in the Point-of-Sale (POS) context, the encoded information scanners 110 and 111 may be barcode scanners, RFID scanners, and/or image scanners (e.g., cameras, flatbed scanners, etc.), etc., that read encoded information, such as a barcode, QR code, alphanumeric string, unique image, etc., from a paper document, a product's packaging, a mobile device (e.g., a smartphone, tablet, a personal digital assistant (PDA), a laptop computer, a wearable device, etc.) displaying the encoded information, etc. The encoded information may conform to and/or be generated according to a specific encoded information system, such as a Universal Product Code (UPC) encoding system, an International Article Number (EAN) encoding system, an International Standard Book Number (ISBN) encoding system, other well-known coding systems, an RFID identification system, a holographic encoding system, etc. The encoded information may include information that is to be verified and/or applied by the end point terminal, such as personal identification information, biometric information, product information, price information, coupon information, promotion information, membership information, loyalty program information, expiration/validity information (e.g., expiration date, date ranges that the coupon is valid for, etc.), value information, etc.

Additionally, in a document verification context (such as security checkpoints, airport terminal/customs security, ticketing checkpoints (e.g., sports events, concerts, etc.), currency verification, banknote verification, etc.), the encoded information scanners 110 and 111 may be barcode scanners, radio frequency identification (RFID) scanners, image scanners, infra-red (IR)/ultra-violet (UV) scanners, holographic image detectors, near field communication (NFC) scanners, etc., for detecting and/or reading encoded information from security features of a document. The encoded information may conform to and/or be generated according to specific secure encoded information systems, such as information printed special ink only detectable under IR/UV light, special holograms, magnetic dots, magnetic inks, security threads, unique serial numbers, biometric information, encrypted and/or tokenized information requiring public/private key decryption methods, etc. The encoded information may contain information that is to be verified and/or applied by the end point terminal, such as personal identification information, biometric information, currency information, banknote information, membership information, ticket/seat information, etc.

The formatting devices 120 and 121 are processing devices that are connected to the encoded information scanners 110 and 111, respectively, over a wired and/or wireless connection, such as a universal serial bus (USB) connection, a FireWire connection, a Serial Digital Interface (SDI) connection, an Ethernet connection, a Bluetooth connection, a WiFi connection, an infra-red (IR) connection, a Code Division Multiple Access (CDMA) connection, a Global System for Mobile Communications (GSM) connection, a 3G connection, a 4G connection, a 5G connection, an LTE connection, other cellular network connections, a satellite connection, etc., or combinations thereof. The formatting devices 120 and 121 may receive the encoded information scanned by the encoded information scanners 110 and 111, analyze the received encoded information according to one or more rules stored on the formatting devices, determine the destination of the received encoded information according to the results of the analysis, such as the validation device 140 and/or the end point terminals 130 and 131, etc., and then format the received encoded information into a format compatible with the destination based on the specifications of the destination, for example formatting the received encoded information using a desired barcode system and/or proprietary messaging system that the POS terminal is preconfigured to read and interpret. The formatted encoded information may also include tokenized information/data that includes the results of the analysis, as well as metadata pertaining to the validation state of the received encoded information (e.g., has this encoded information type been scanned before, was this encoded information type scanned before, previous verification of the encoded information (i.e., was the encoded information accepted/rejected previously), etc.), metadata pertaining to the operating status of the encoded information scanner(s) and/or formatting device, aggregated statistics stored on the formatting device, etc. Once the received encoded information has been formatted into a format compatible with the destination, the formatting device 120 and/or 121 transmits the formatted encoded information to the destination for further processing. Additional information regarding the formatting device will be discussed in connection with FIGS. 2 and 3.

The validation device 140 is a processing device that is connected to (in other words, associated with) one or more formatting devices (e.g., formatting devices 120 and 121) over a wired and/or wireless connection. The process of connecting the validation device 140 with the one or more formatting devices may also be referred to as associating the formatting devices to the validation device, or pairing the formatting devices to the validation device (e.g., through a Bluetooth and/or other wireless communication pairing process). The validation device 140 may be located in the same physical location and/or network as the one or more formatting devices (e.g., same LAN network, same intranet network, same building, same retail store, a personal area network (PAN), a Bluetooth network, etc.), or may reside at a different physical location and/or different network, and acts as a local rules server for the one or more associated formatting devices. For example, the validation device 140 may be a server and may reside on a cloud network, the Internet, a private network specific to the present encoded information validation system, a cellular network, etc. The validation device 140 is associated with one or more formatting devices and serves as a "clearinghouse" for the validation processing of all of the received encoded information for the one or more associated formatting devices. If the formatting device determines that the destination of the received encoded information is the validation device (e.g., the received encoded information requires validation), the validation device will receive the formatted encoded information and process the encoded information using local rule sets associated with one or more types/categories of encoded information stored on the validation device.

The validation device may include a database storing rules regarding one or more encoded information types/categories, such as multi-use coupons, one-time use coupons, limited time product promotions, product sales information, other limited use offers, one-time use ticket information, allowed/restricted personnel information, allowed/restricted passenger information, information related to how to verify security products, valid/invalid serial numbers, etc., and may analyze the formatted encoded information using the rules stored in the database. Once the validation process has been performed, the validation device modifies the formatted encoded information by including the results of the validation in the formatted encoded information message, include a message regarding the validation status of the encoded information, and/or include instructions for the terminal operator (e.g., process the encoded information manually, apply extra security measures, contact security, contact law enforcement, etc.) to be displayed on a display device associated with the end point terminal (e.g., POS terminal, etc.). Additionally, the validation device may transmit software updates to the formatting devices, such as providing new and/or updated rules, new and/or updated security policy information, new and/or updated encryption/decryption keys, firmware updates, etc. The formatting device may install the received software updates based on a determination that the software updates are of a higher version number than the software currently installed on the formatting device.

For example, in the POS context, a plurality of formatting devices may be installed in a single retail store, each of the plurality of formatting devices associated with at least one barcode scanner and at least one POS terminal (e.g., cash register, checkout kiosk, etc.). In the security context, a plurality of formatting devices may be installed at various security checkpoints and/or turnstiles in a physical location, such as an airport, sports arena, office building, etc. Each of the plurality of formatting devices is associated with a single validation device that is associated with the retail store/physical building. The plurality of formatting devices may connect to the validation device over a wired/wireless connection (e.g., USB, Bluetooth, wired/wireless LAN, cellular connection, etc.). In some example embodiments, the formatting devices and validation device connect over a secure private network, such as a Bluetooth PAN, etc., that is separate and/or independent from the retail store's/physical location's existing network, thereby providing additional security over the communications between the formatting devices and the validation device by requiring separate security credentials to access the network, while advantageously appearing transparent to the existing retail store's/physical location's computer network and existing POS terminal/security terminal system. With this system configuration, the retail store's/physical location's information technology (IT) maintenance costs are reduced because the encoded information validation system is independent from the retail store's/physical location's existing IT infrastructure, provides for greater security because the security of the encoded information validation system is independent from the security of the retail store's/physical location's pre-existing system since the two systems operate on separate networks that require separate security credentials, integrates seamlessly with the retail store's/physical location's pre-existing terminal system (e.g., the retail store's barcode scanners and POS terminals, security scanner system, building security badge system, etc.) without modification to any network settings, and allows the pre-existing POS terminal system to operate normally without requiring awareness of and/or additional software customized for the encoded information validation system.

The validation device 140 may also be connected over a wired and/or wireless connection to a platform server, such as a cloud server. The validation device 140 may transmit statistics regarding received encoded information (aggregated and/or individual), validation determination results (aggregated and/or individual), formatting device operating status information, validation device operating status information, etc. Additionally, the cloud server may transmit software updates to the validation device 140, such as new and/or updated validation rules for the validation device 140, new and/or updated forwarding rules for the formatting device 120, new and/or updated custom matching rules for the formatting device 120, new and/or updated security policy information for the validation device 140 and/or formatting device 120, new and/or updated encryption/decryption keys for the validation device 140 and/or formatting device 120, firmware updates for the validation device 140 and/or formatting device 120, multimedia content to be displayed and/or broadcast by the validation device 140, etc. Additional information regarding the validation device 140 will be provided in connection with FIGS. 4 and 5.

Figure 2:
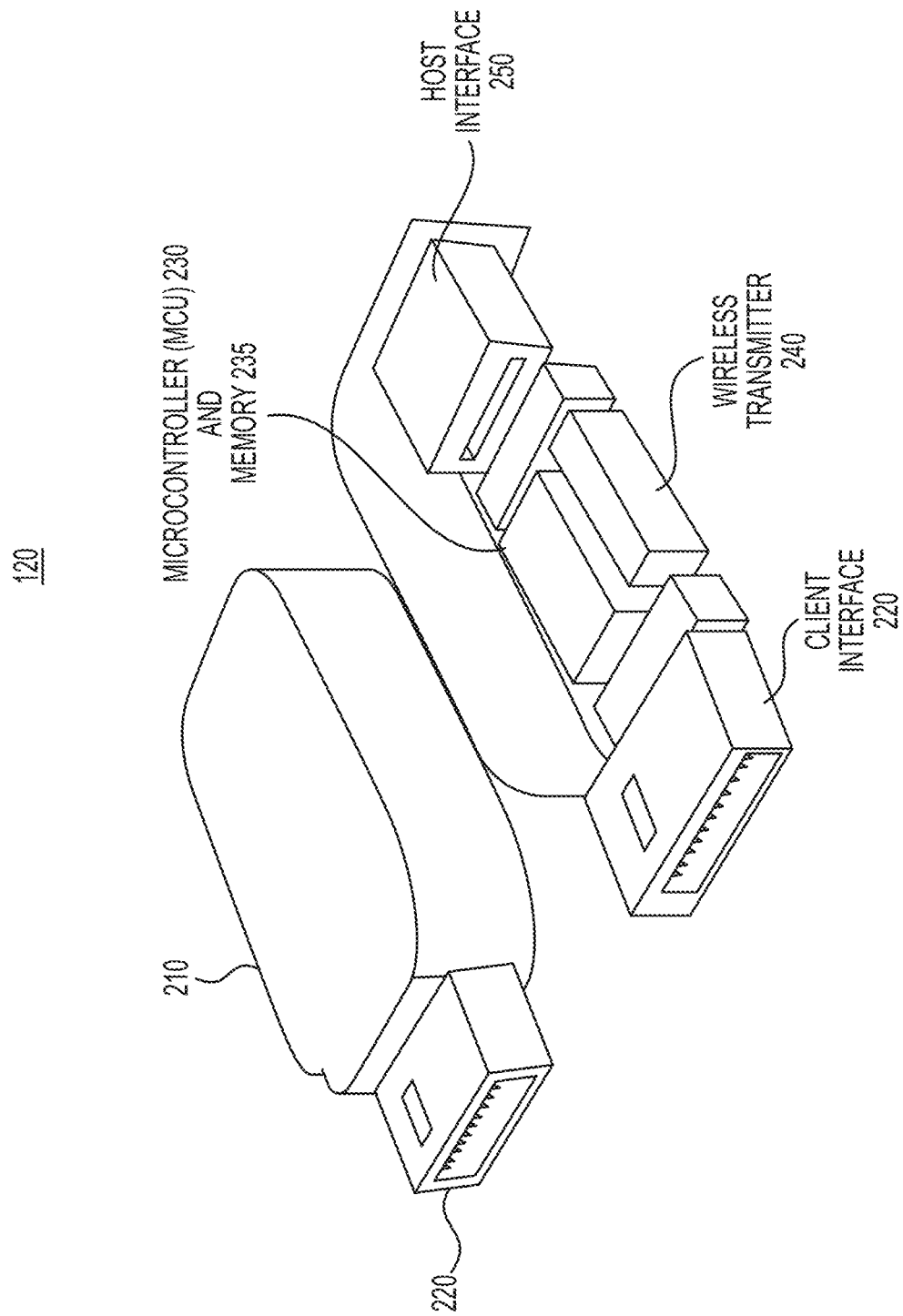
FIG. 2 illustrates a hardware configuration of a formatting device according to at least one example embodiment.

FIG. 2 illustrates the hardware configuration of the formatting device 120 according to at least one example embodiment. In various example embodiments, the formatting device, such as formatting device 120 or 121, includes at least a housing 210, a client interface 220, a microcontroller (MCU) 230 and memory 235, a wireless transmitter 240, and a host interface 250. The housing 210 may be formed according to various form factors, particularly small form factors, such as a USB device form factor. The client interface 220 is a physical interface configured to physically connect the formatting device 120 with other elements of the encoded information validation system, such as the end point terminal 130 and/or the validation device 140. Additionally, the formatting device 120 may also include a second physical interface, host interface 250, which physically connects the formatting device 120 with other elements of the encoded information validation system, such as the scanning device 110. The client interface 220 and the host interface 250 are compatible with the scanning device 110 and the end point terminal 130, with the scanning device 110 and end point terminal 130 sharing the same communication protocol/standard.

For example, according to at least one example embodiment, the client interface 220 and the host interface 250 may be USB communication protocol interfaces, and the host interface 250 may connect to a USB-type scanning device and the client interface 220 may connect to an end point terminal with USB ports. The formatting device 120 may be installed in-line between the scanning device 110 and the end point terminal 130, e.g., the USB connector of the scanning device 110 that would normally connect to the end point terminal 130 is instead connected to the USB host interface 250 of the formatting device 120, and the USB client interface 220 of the formatting device 120 is connected to a USB port (and/or USB cable connected to the USB port) of the end point terminal 130. Accordingly, the scanning device 110 may natively transmit the received encoded information (e.g., a barcode, QR code, image, etc.) to the formatting device 120 using the native connection type that the scanning device 110 and the end point terminal 130 is configured for using the native communication protocol for the scanning device/end point terminal system, while the formatting device 120 transparently intercepts and/or redirects the communication for validation and/or further processing, or in the event that validation and/or further processing is not necessary, directly passes the native communication from the scanning device 110 to the end point terminal 130 without interruption or modification. Additionally, the formatting device 120, when installed in-line with the end point terminal 130, may receive electrical power from the end point terminal 130 through the client interface 220 and may not require an external electrical power source. For example, when the formatting device 120 connects to the end point terminal 130 via a USB port, the formatting device 120 may receive electrical power from the end point terminal 130 via the USB connection sufficient to power the formatting device 120.

Moreover, the client interface 220 and the host interface 250 are not limited to a wired USB interface, but may be any suitable wired connection interface, such as a RS-232 interface, FireWire interface, PCIe interface, Serial ATA interface, a fiber-optic interface, etc. Additionally, according to at least one example embodiment, the scanning device 110 and the formatting device 120, and/or the formatting device 120 and the end point terminal 130 may communicate over a wireless connection using the wireless transmitter 240, such as a Bluetooth network, wireless LAN network, a cellular network, etc., instead of, or in addition to, the wired connection.

Referring again to FIG. 2, the formatting device 120 also includes a MCU 230 and memory 235. According to at least one example embodiment, the MCU 230 and memory 235 may be combined into one unit, but is not limited thereto and may be separate units. The MCU 230 is a processing device, such as a microcontroller, a central processing unit (CPU), an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner Advantageously, the MCU 230 may be a low power processing device, such as a low power ARM based processor, a low power CISC based processor (e.g., x86 ISA), etc., in order to perform the forwarding rules (and/or custom matching rules) determination. The memory 235 may comprise one or more non-transitory computer storage media, such as one or more of ROM memory, RAM memory, flash memory, solid state disk, etc. The MCU 230 is configured to execute computer readable instructions stored in the memory 235 to perform the wired and/or wireless communications, such as the USB communication between the scanning device 110, the formatting device 120, and the end point terminal 130, etc., and/or the Bluetooth communication between the formatting device 120, the formatting device 121, and/or the validation device 140, etc. The MCU 230 is also configured to analyze the received encoded information from the scanning device 110 based on a set of classification rules, forwarding rules, and/or custom matching rules stored in the memory 235. The memory 235 may store configuration information specific to the particular end point terminal model to which the formatting device 120 is connected.

For instance, there are many different POS terminal manufacturers that provide proprietary (i.e., non-standard) input/output (I/O) protocols for use with their individual POS terminal models. In addition, each manufacturer may have incompatible model lines and/or product types that may use different I/O protocols as well. Therefore, there may exist many different individual proprietary I/O protocols, each with its own proprietary message types, data formats, etc., that are incompatible with each other. Moreover, the formatting device 120 may be loaded with specialized configuration information to be executed by the MCU 230 for the one or more types of end point terminals that it may be connected to (either manually or through an automatic update from the validation device 140). The type of end point terminal may be obtained either manually (i.e., a human operator may determine the end point terminal type and load the necessary configuration information into the formatting device and/or validation device), or an automatic discovery process may be executed by the formatting device 120 and/or validation device 140 in order to determine the compatible configuration information for use with the end point terminal(s) for that installation location (e.g., end point terminals 130 and 131).

The formatting device 120 may also include a wireless transmitter 240. The wireless transmitter 240 may be a transmitter/receiver configured to connect to various wireless networks, such as Bluetooth network, a wireless LAN network, a cellular network (e.g., CDMA, GSM, 4G LTE, etc.), a satellite network, etc. For example, the wireless transmitter 240 may be a Bluetooth low energy (BLE) transmitter/receiver capable of connecting to a Bluetooth PAN. The wireless transmitter 240 may connect to various hardware devices capable of connecting to the network associated with the encoded information validation system, such as the validation device 140, other formatting devices (e.g., formatting device 121) located within the wireless network's broadcast range (e.g., other formatting devices located in the same retail store, same airport, same office building, etc.). The wireless transmitter 240 may also connect to electronic displays configured to operate on the encoded information validation network, such as electronic signs, billboards, televisions, monitors, etc., and transmit multimedia content to the electronic displays (e.g., promotional information, advertisements, security warnings, real-time news, real-time weather, etc.) located within the wireless network's broadcast range. Further, the wireless transmitter 240 may also connect to mobile devices compatible with the encoded information validation network, such as smartphones, laptops, tablets, wearable devices, etc., in order to transmit and/or broadcast the multimedia content and/or personalized content (e.g., content personalized for the owner associated with the mobile device, such as personalized coupons, sales promotions, etc.) to the mobile device.

For example, the wireless transmitter 240 may act as a Bluetooth beacon for various mobile devices that have Bluetooth transmitters and are open to new Bluetooth connections and thereby transmit the multimedia content, personalized content, security alerts, real-time news, etc., to the mobile devices. Additionally, in certain example embodiments, the wireless transmitter 240 may connect to one or more scanning devices (e.g., scanning devices 110, 111) and/or end point terminals (e.g., end point terminals 130, 131) to transmit/receive the encoded information and messages related to the encoded information.

Figure 3:
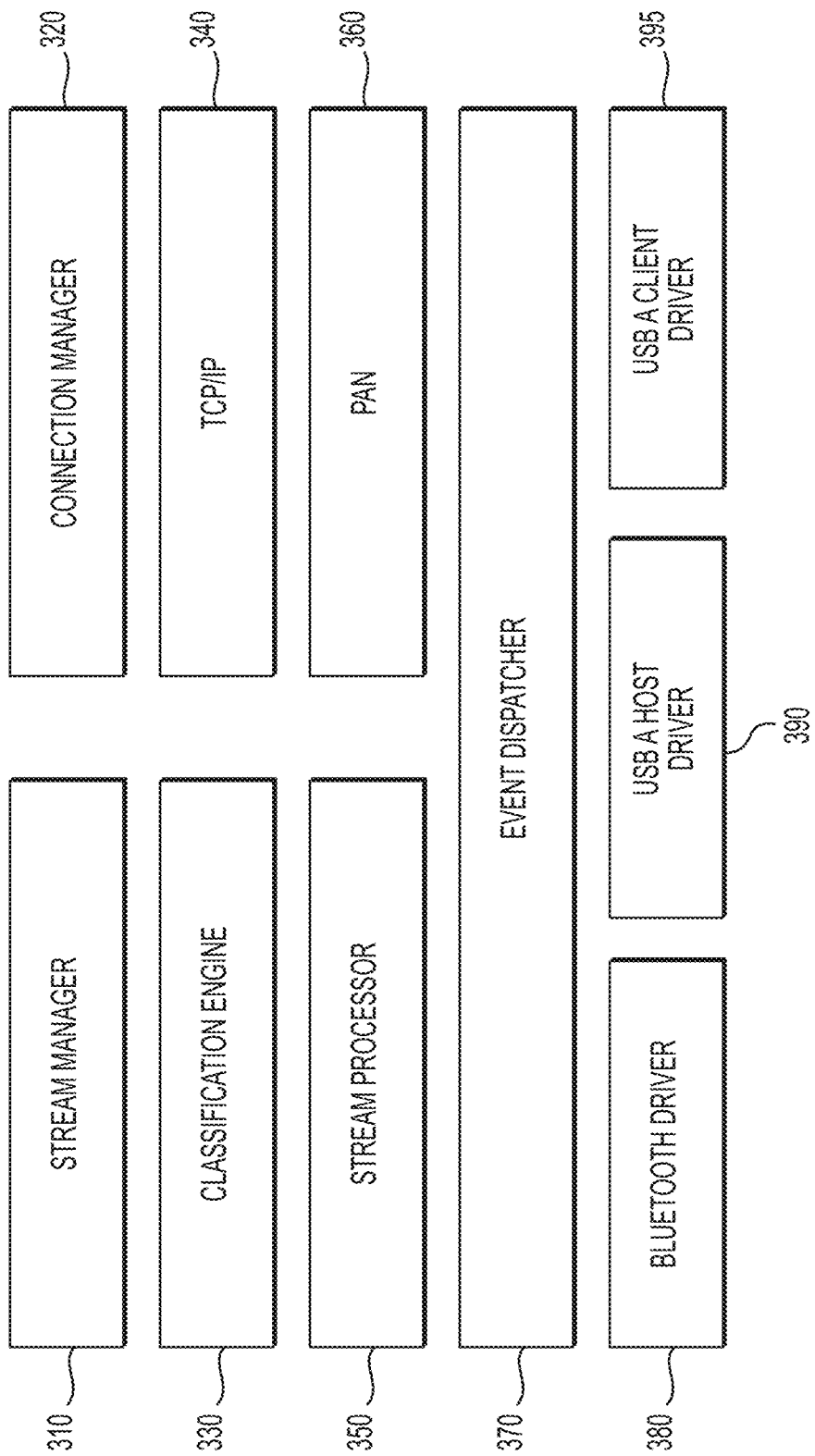
FIG. 3 illustrates a block diagram for the software modules of a formatting device according to at least one example embodiment.

FIG. 3 illustrates a block diagram for the software modules of the formatting device 120 according to at least one example embodiment. The memory 235 stores various computer readable instructions related to the example embodiments, such as instructions that cause the MCU 230 to execute a low resource operating system (OS). Moreover, the memory 235 stores software modules that cause the MCU 230 to form a stream manager 310, a connection manager 320, a classification engine 330, a TCP/IP connection manager 340, a stream processor 350, a personal area network (or other network) manager 360, and/or an event dispatcher 370. Additionally, the memory 235 stores various device drivers related to the wired and wireless connections, such as, for example, a driver associated with the wireless connection (e.g., Bluetooth driver 380), and/or a driver associated with the wired connection (e.g., USB Host driver 390 and USB Client driver 395). The memory 235 may store additional device drivers to facilitate communication/interoperability with one or more scanning devices (e.g., scanning device 110, 111), one or more validation devices and/or local rules servers (e.g., validation device 140), one or more formatting devices (e.g., formatting device 120, 121), and/or one or more end point terminals (e.g., end point terminal 130, 131). The additional device drivers may be included with and/or combined with the wired and/or wireless connection device drivers (e.g., the USB Host driver 390 may act as a device driver for the end point terminal driver, the USB Client driver 395 may act as a device driver for the scanning device, etc.).

For example, the computer readable instructions may include instructions related to an event dispatcher 370 that is configured to detect inbound encoded information (e.g., encoded information transmitted from the scanning device 110 to the end point terminal 130) and communication events from the validation device 140. If the event dispatcher 370 detects an inbound encoded information event, the event dispatcher may initiate the stream processor 350, which is configured to intercept the inbound encoded information that was formatted using the scanning device/end point terminals native communication protocol, such as a binary data format that contains the information encoded in the encoded information. For example, the inbound encoded information may be formatted using a proprietary data format specific to the end point terminal 130. The stream processor 350 then normalizes the inbound encoded information into a standard data packet format for use with the validation system (for example, the data packet format to be discussed in detail in connection with FIG. 7) as a data stream. In other words, the stream processor 350 will transform the inbound encoded information into a data stream compatible with the formatting device 120 and/or the validation device 140. After normalizing the inbound encoded information into a data stream and/or standard data packet format, the stream processor 350 transfers the data stream to the classification engine 330. The classification engine 330 then analyzes the data stream according to a set of classification rules stored in the memory 235 that classifies encoded information into one of a plurality of classification layers, or in other words, a classification type.

For example, the data stream may be analyzed by the classification engine 330 for particular attributes and/or characteristics, such as a desired string pattern, the formatting type of the encoded information (e.g., Codabar, Bar Code 2/5 interleaved, EAN 8, ISBN, ITF-14, SCC-14, UPC A, UPC E, GS1 Databar, QR code, etc.), the length of the encoded information, an embedded string sequence within a desired location of the encoded information (e.g., the last 8 bits of the encoded information), a desired image embedded in the data stream, etc. The data stream may be classified based on the results of the analysis. In the retail store context, the classification layers/types may include encoded information related to a print coupon, a one-time use coupon, an electronic coupon, a product package, a QR coupon, a coupon image, an image of a promotion, a gift card, a loyalty card, a club membership card, a subscriber card, etc., but is not limited thereto. In the identity verification context, the classification layers/types may include encoded information related to a barcode format associated with a state driver's license, a barcode format associated with a passport, an image of a social security card, an image of a birth certificate, RFID/NFC chip information including biometric information from an e-passport, etc. In the airport ticketing context, the classification layers/types may include encoded information related to a printed boarding pass, an electronic boarding pass, a barcode associated with a luggage claim ticket, a frequent flyer account, etc.

Once the classification layer of the data stream is determined, the stream manager 310 is initiated and applies a routing decision based on the classification layer of the data stream, a set of forwarding rules (e.g., matching rules), and/or custom matching rules stored in the memory 235. The set of forwarding/matching rules determines the forwarding destination for each of the classification layer/types that the data stream may be classified under. There may be a set of forwarding/matching rules for each of the plurality of classification layers and/or a single set of forwarding/matching rules applied for all classification layers. For example, if the barcode is classified as a one-time-use barcode, it is forwarded (e.g., routed) to the validation device 140 for further processing. As another example, if the data stream is classified as a valid, but unknown barcode (e.g., the barcode is associated with certain loyalty card programs, membership programs, gift card programs, credit card accounts, financial accounts, etc., that do not require validation processing, etc.), then the data stream is immediately forwarded/routed to the POS terminal. The custom matching rules refer to rules related to custom encoded information, such as, for example, uniquely generated encoded information using the web service associated with the validation system discussed in further detail in connection with FIG. 5, that may not fall under one of the forwarding rules. Additionally, the stream manager 310 is configured to forward/route data streams directly to the end point terminal, such as end point terminal 130, if the wired and/or wireless connection to the validation device 140 is not established, lost, times out, etc., as a failover and/or default state in order to ensure transparent, normal processing of encoded information by the pre-existing end point terminal system when there are issues with the encoded information validation system.

Figure 4:
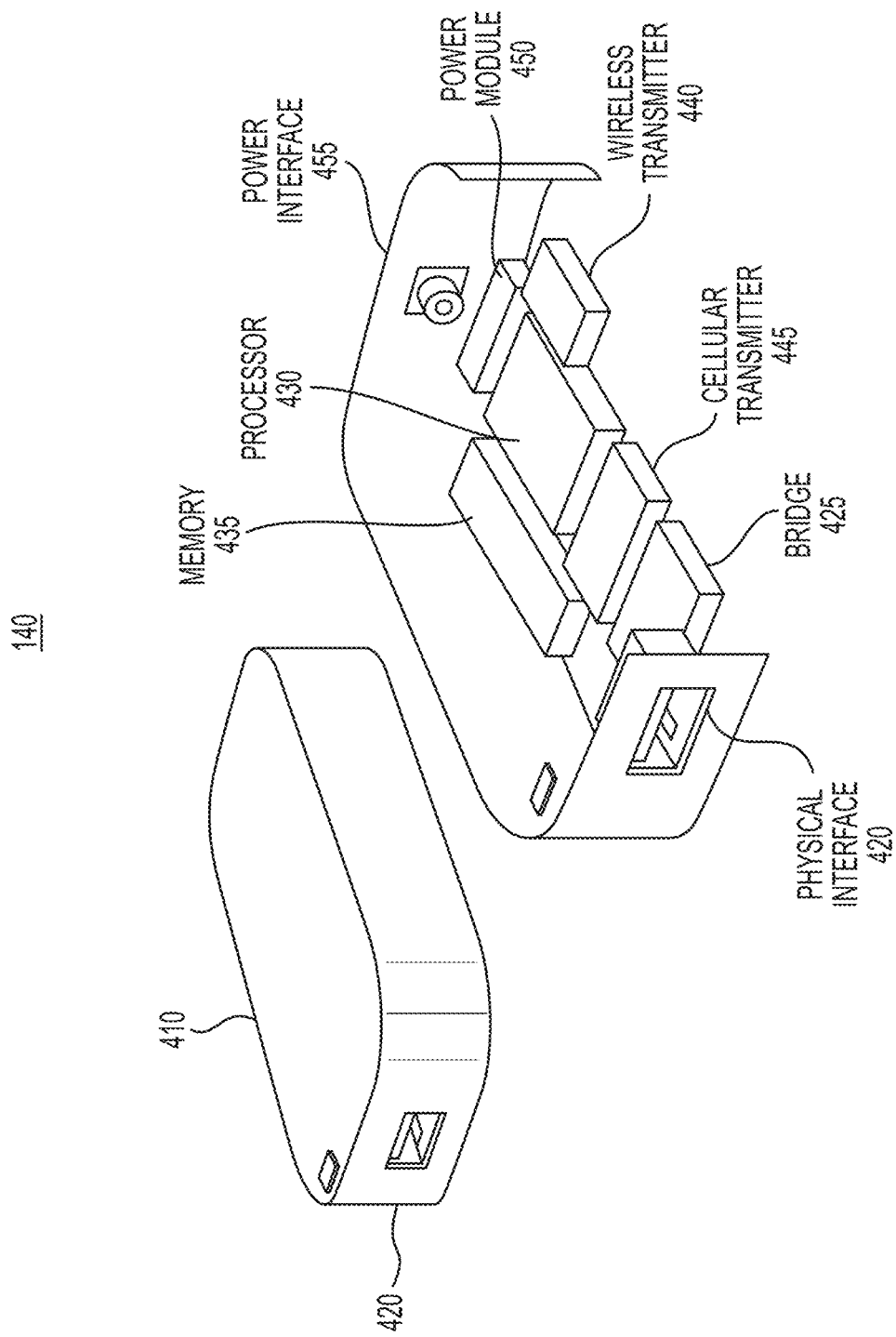
FIG. 4 illustrates a hardware configuration of a validation device according to at least one example embodiment.

FIG. 4 illustrates the hardware configuration of a validation device, such as validation device 140, according to at least one example embodiment. In various example embodiments, the validation device 140 includes a housing 410, a physical interface 420, at least one processor 430, a memory 435, and a wireless transmitter 440. The validation device 140 may additionally include an interface bridge 425, a cellular transmitter 445, a power module 450, and a power interface 455. While various elements of validation device 140 are illustrated in FIG. 4, the example embodiments are not limited thereto, and there may be a greater or lesser number of hardware elements in the validation device according to other example embodiments. For example, there may be additional non-transitory storage devices included in other example embodiments of the validation device, the wireless transmitter 440 and the cellular transmitter 445 may be combined and the like. Additionally, according to at least one example embodiment, the validation device 140 may be combined with the formatting device 120 and may be configured to serve as a master formatting device.

The housing 410 may be formed according to various form factors, particularly small form factors, such as a USB device form factor. The physical interface 420 is configured to physically connect the validation device 140 with other elements of the encoded information validation system, such as one or more formatting devices, such as the formatting devices 120 and 121, and/or one or more end point terminals, such as end point terminal 130 and 131. The physical interface 420 may be configured to be compatible with various interface protocols, such as the USB standard. When the physical interface 420 is physically connected to a formatting device, the validation device may transmit software to the formatting device, such as new and/or updated forwarding rules for the formatting device, new and/or updated custom matching rules for the formatting device, new and/or updated security policy information for the formatting device, new and/or updated encryption/decryption keys for the formatting device, firmware updates for the formatting device, configuration information related to a desired end point terminal system (e.g., configuration information related to the end point terminal that the formatting device is connected), etc. Additionally, the validation device may receive various data stored on the formatting device, such as information regarding the encoded information that was intercepted by the formatting device, operating status information regarding the formatting device, etc.

When the physical interface 420 is physically connected to an end point terminal, the validation device 140 may execute various auto-detection software routines to determine the model number of the end point terminal and to determine the appropriate configuration information related to the model number of the end point terminal. The auto-detection software routine is configured to determine the model number of the end point terminal by, for example, detecting metadata related to the end point terminal, initiating a communication session with the end point terminal (e.g., telnet session, etc.) and interrogating the end point terminal, determining the communication protocol used by the end point terminal, executing a series of specific commands related to various manufacturers and/or product lines to determine a positive response, etc. Additionally, the validation device 140 may be manually updated and/or configured using the physical interface 420 by attaching an external device (e.g., a USB thumb drive, an external hard drive, a PC, a laptop, a smartphone, a tablet, etc.) to the to the physical interface 420 and uploading the new software to the validation device 140. The validation device 140 may also transmit/receive data and/or software updates over a wireless network, such as the wireless network associated with the wireless transmitter 440 and/or the cellular transmitter 445.

The validation device 140 also includes at least one processor 430 and memory 435. According to at least one example embodiment, the processor 430 and memory 435 may be combined into one unit, but is not limited thereto and may be separate units. The processor 430 is a processing device, such as a microcontroller, a central processing unit (CPU), an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. The memory 435 may comprise one or more non-transitory computer storage media, such as one or more of ROM memory, RAM memory, flash memory, solid state disk, etc. The processor 430 is configured to execute computer readable instructions stored in the memory 435 to perform the wired and/or wireless communications, such as the Bluetooth communication between the formatting device 120, the formatting device 121, etc., and/or the cellular network communication between the validation device and one or more servers, such as a cloud server and/or platform server. The processor 430 is also configured to analyze the data stream transmitted by a formatting device (e.g., formatting device 120 and/or 121) based on a set of validation rules stored in the memory 435. Additionally, the memory 435 may store configuration information specific to the particular end point terminal model to which the formatting device associated with the validation device 140, such as formatting devices 120 and 121, are connected.

The validation device 140 may also include a wireless transmitter 440 and/or a cellular transmitter 445. The wireless transmitter 440 may be a transmitter/receiver configured to connect to various wireless networks, such as Bluetooth network, a wireless LAN network, etc., and the cellular transmitter 445 may be a transmitter/receiver configured to connect to a cellular network (e.g., CDMA, GSM, 4G LTE, etc.), a satellite network, etc. The wireless transmitter 440 and the cellular transmitter 445 may also be combined according to various example embodiments. For example, the wireless transmitter 440 may be a Bluetooth low energy (BLE) transmitter/receiver capable of operating and/or connecting to a Bluetooth PAN. The wireless transmitter 440 may connect to various hardware devices capable of connecting to the network associated with the encoded information validation system, such as the one or more formatting devices (e.g., formatting devices 120 and 121) located within the wireless network's broadcast range (e.g., formatting devices located in the same retail store, same airport, same office building, etc.). The wireless transmitter 440 may also connect to electronic displays configured to operate on the encoded information validation network, such as electronic signs, billboards, televisions, monitors, etc., and transmit multimedia content to the electronic displays (e.g., promotional information, advertisements, security warnings, real-time news, real-time weather, etc.) located within the wireless network's broadcast range. Further, the wireless transmitter 440 may also connect to mobile devices compatible with the encoded information validation network, such as smartphones, laptops, tablets, wearable devices, etc., in order to transmit and/or broadcast the multimedia content and/or personalized content (e.g., content personalized for the owner associated with the mobile device, such as personalized coupons, sales promotions, etc.) to the mobile device. For example, the wireless transmitter 440 may act as a Bluetooth beacon for various mobile devices that have Bluetooth transmitters and are open to new Bluetooth connections and thereby transmit the multimedia content, personalized content, security alerts, real-time news, etc., to the mobile devices.

The validation device 140 is configured to serve as a synchronization point for all formatting devices installed in a single physical location (e.g., a retail store, office building, airport, etc.). The validation device 140 may store in memory 435 information and/or data, such as logging information, software releases, factory installations, etc., related to the validation device itself and the formatting devices located within the same location. The validation device 140 may also include a power module 450 and a power interface 455 configured to provide external power to the validation device 140.

Figure 5:
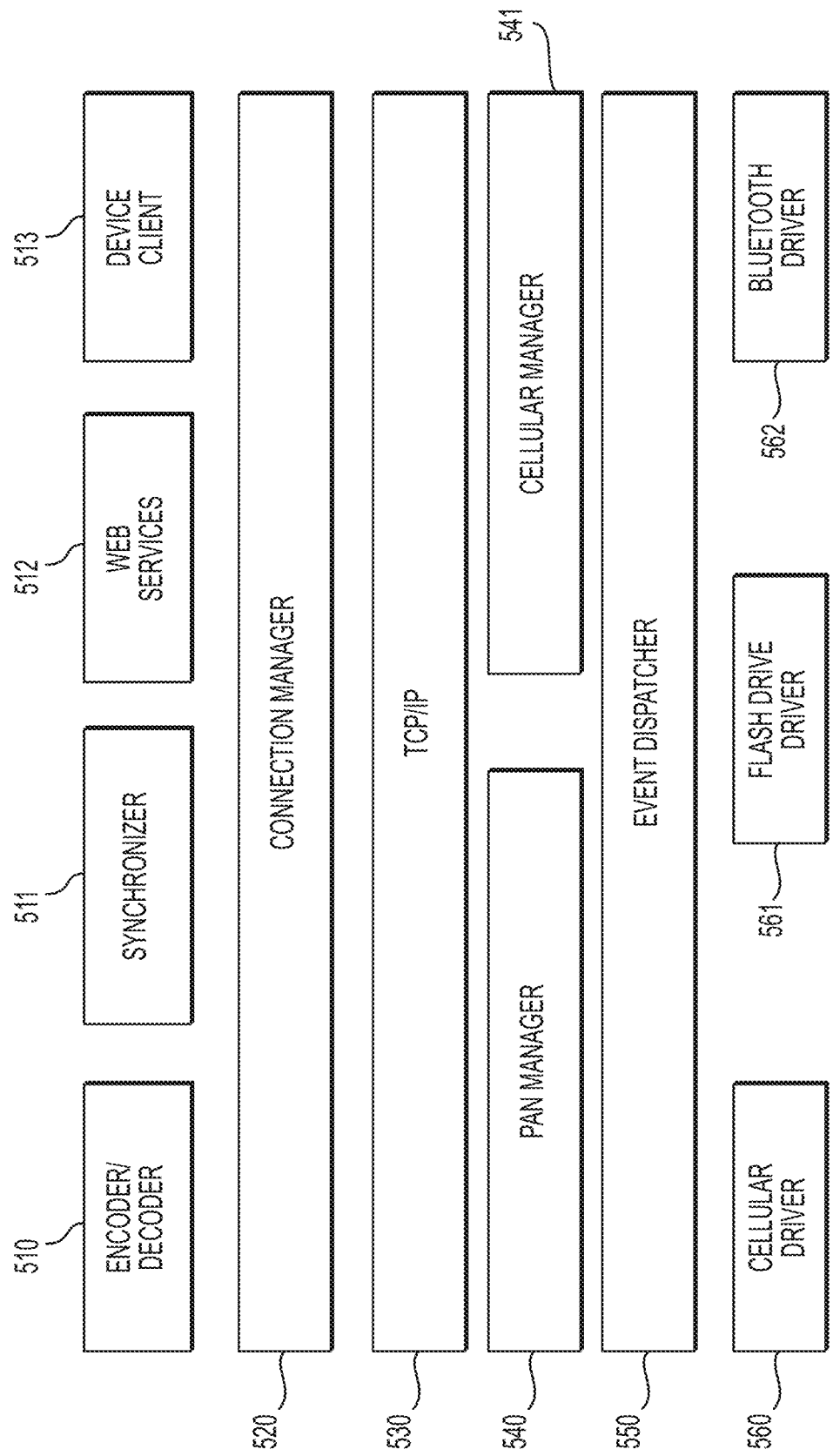
FIG. 5 illustrates a block diagram for the software modules of a validation device according to at least one example embodiment.

FIG. 5 illustrates a block diagram for the software modules of a validation device, such as validation device 140 according to at least one example embodiment. The memory 435 stores various computer readable instructions related to the example embodiments, such as instructions that cause the processor 430 to execute an operating system (OS) (not shown). Moreover, the memory 435 stores software modules that cause the processor 430 to form an event dispatcher 550, a connection manager 520, a TCP/IP connection manager 530, a personal area network (or other network) manager 540, a cellular network manager 541, an encoder/decoder module 510, a synchronizer 511, a web services manager 512, and/or a device client manager 513. Additionally, the memory 435 stores various device drivers, such as, for example, a cellular transmitter driver 560, a flash memory driver 561, and Bluetooth driver 562, etc.

For example, the computer readable instructions may include instructions related to an event dispatcher 550 that is configured to accept connections from authorized formatting devices over, for example, a Bluetooth connection or wireless LAN connection. The connection may be over a private network configured to support the encoded information validation system that may require secure authentication before a connection to the private network is established. The connection manager may be initiated and executed to initiate the private network and to execute the secure authentication scheme of the private network according to at least one example embodiment, but the example embodiments are not limited thereto. The event dispatcher 550 is also configured to detect incoming communications from the one or more formatting devices, such as transmitted data streams transmitted from the formatting devices to be validated by the validation device 140. Once a data stream has been detected and received by the event dispatcher 550, the processor 430 executes the computer readable instructions related to the encoded information algorithm module 510 that includes a plurality of sets of validation rules stored in memory 435 related to a plurality of encoded information sets. For example, in the retail store context, the memory 435 may include a set of validation rules associated with a plurality of products (e.g., specific validation rules related to desired UPC codes, barcodes, product packaging images, etc.), a plurality of manufacturer specific validation rules, a plurality of retailer specific validation rules (e.g., desired store locations that a particular encoded information is valid/invalid for, etc., time restriction rules, age restriction rules, etc.), validation rules related to one-time use coupons, validation rules related to uniquely generated encrypted coupons, validation rules related to images, etc.

The processor 430 then executes the encoder/decoder module 510 instructions to cause the processor 430 to form a tokenizer. The tokenizer processes the data stream and extracts any additional information embedded in the data stream associated with the original received encoded information. In at least one example embodiment, the tokenizer may extract information, such as an identifier, a name, a username, a transaction id, a serial number, a store id, an electronic signature, a security signature, a barcode, an address, a transaction amount, a discount amount, an expiration date, a time range for validity, special validity instructions, biometric information, seat number, gate number, flight number, etc., based on a pre-configured position of the data within the data stream.

Further, according to at least one example embodiment, the data stream may include encrypted embedded information that may be decrypted by the tokenizer. For example, the encrypted embedded information may be encrypted encoded information generated by a related cloud server (and/or other server, web platform, web service, etc.) using a public key associated with the validation device 140. The encrypted encoded information may then be transmitted to a user who presents the encrypted encoded information to the scanning device 110. Once scanned and/or received by the scanning device 110, the encrypted encoded information may be decrypted by the tokenizer using a private key stored on the validation device 140. As another example, the encrypted embedded information may have been encrypted using a digital signature stored on the cloud server (and/or other server, web platform, web service, etc.) that may be decrypted using a decryption algorithm stored on the validation device 140. In at least one example embodiment, the encoded information being encrypted by, for example, the cloud server and/or web service platform, may represent unique information (e.g., biometric information, a unique identifier (such as a social security number, a currency note serial number, a credit card number, a bank account number, etc.), a one-time use coupon, a unique message, a unique special instruction, a unique and/or random computer generated number, a unique and/or random computer generated image, etc.).

Next, the processor 430 determines the validation state information regarding the encoded information embedded in the data stream (e.g., determine whether the encoded information is valid/invalid, accepted/rejected, authentic/counterfeit, etc.), and then modifies the data stream to include additional information such as the validation state information of the encoded information (e.g., the results of the validation processing), a text message regarding the validation status of the encoded information, and/or include textual instructions for the terminal operator (e.g., "process the encoded information manually," "apply extra security measures," "contact security," "contact law enforcement," etc.) to be displayed on a display device associated with the end point terminal, as well as additional tokenized information (e.g., the additional information extracted by the tokenizer function) related to the validation processing. Advantageously, the addition of the tokenized information to the data stream, i.e., the tokenization of the data stream, allows the data stream to be processed asynchronously. In other words, the tokenization of the data stream and the stored tokenized information allows the data stream to be processed by the validation system at any time, and the system is not dependent on the immediate, or time-constrained, completion of the validation process, and the tokenized data stream may be saved by the user/consumer/etc., electronically or on paper, and may be processed by the end point terminal 130 at any later point in time. The tokenizer may also encrypt the tokenized information and/or the modified data stream in accordance with an encryption algorithm. For example, in the security verification context, certain biometric information included in the encoded information may have been encrypted and the biometric information, along with the results of the validation of the biometric information, may be encrypted by the tokenizer in order to secure the information being validated from any potential hacking and/or other attack during the validation process. Next, the processor 430 then transmits the modified data stream to the originating formatting device using the wireless transmitter 440 and/or cellular transmitter 445. After the formatting device receives the modified data stream, the formatting device forwards the modified data stream to the end point terminal connected to the formatting device.

Additionally, the encoded information may also relate to a non-binary determination state, such as a multi-use ticket/pass, money stored in a gift card, etc., and the state information will be updated based on the results of the validation determination (e.g., the multi-use ticket/pass will be decremented, the total amount stored on the gift card will be decremented, etc.). The encoded information (e.g., the unique identifier associated with the encoded information, a serial number associated with the encoded information, etc.), the validation results of the encoded information, and/or state information of the encoded information may be stored in a database table (not shown) in the memory 435. The processor 430, executing the computer readable instructions related to the synchronizer 511, may transfer/synchronize in real-time, on demand, and/or on a periodic basis, some or all of the database table with the formatting devices associated with (e.g., paired with) the validation device 140, other validation devices over the cellular network, and/or the one or more cloud servers/platform servers. For example, the validation device 140 may synchronize information regarding one-time use coupons with the formatting devices paired with the validation device 140, other validation devices, and/or the cloud servers, in order to decrease and/or prevent the fraudulent use of one-time use coupons multiple times by automatically updating/synchronizing the state information of the identifier associated with the one-time use coupon with the formatting devices, validation devices, and/or servers. As another example, the validation device 140 may determine that a particular credit card number has been declined by the card's authorizing bank due to suspicious activity on the account, and may then synchronize the validation status of the credit card number with the formatting devices, validation devices, and/or servers. As a further example, a security officer may access the validation device 140 via the web service manager 512 connected to a cloud server and place a security flag on a desired person's identification information (e.g., driver's license number, social security number, unique identifier associated with the desired person's passport, etc.) and the validation device 140 may synchronize/update the validation status of the identification information associated with the desired person in the formatting devices and/or other validation devices.

The synchronizer 511 may also perform synchronization of information and/or algorithms associated with the encoder/decoder 510, such as the encryption/decryption keys, encryption/decryption algorithms, encoding/decoding algorithms, etc., with the information and/or algorithms stored on the formatting devices paired with the validation device 140, other validation devices, and/or the cloud servers. For example, if an encryption key and/or algorithm associated with a cloud server service is modified and/or updated (e.g., a time based aging of encryption keys), the synchronizer 511 may download the modified and/or updated encryption key and/or algorithm from the cloud server service, and may transfer the downloaded encryption key and/or algorithm to the formatting devices paired with the validation device 140, other validation devices, or vice versa. Additionally, the synchronizer 511 may also perform similar synchronization of new and/or updated rules, new and/or updated security policy information, and/or firmware updates between the cloud server and the validation device 140, the formatting devices paired with the validation device 140, other validation devices, etc.

Further, the processor 430 may execute the web services manager 512 in order to enable web functionality for the validation device 140. For example, validation information regarding desired encoded information may be created and/or updated by a user accessing the web service (e.g., through a cloud service and/or service platform), including creating new one-time use encoded information, creating/updating validation rules related to one or more encoded information (e.g., creating rules related to various restrictions placed on a particular set of encoded information, such as time restrictions on the use of the encoded information set, location restrictions on the use of the encoded information, frequency restrictions on the use of the encoded information, etc.), uploading new multimedia content (e.g., advertisement videos, textual advertisements, security warnings, real-time news, promotional information, coupons, etc.) to be broadcast by the validation device 140 and/or uploaded to electronic displays, mobile devices, etc., proximate to the validation device 140, etc. Further, a user of the cloud service may also create unique encrypted coupons using a private key associated with the cloud service and/or the validation device, where the unique encrypted coupon may be transmitted to one or more customers and the information necessary to process the unique encrypted coupon, e.g., the validation information, validation rules, and/or decryption key, may be transmitted to the validation device 140 for use when the data stream indicates that the unique encrypted coupon has been intercepted by a formatting device associated with the validation device 140.

Figure 6:
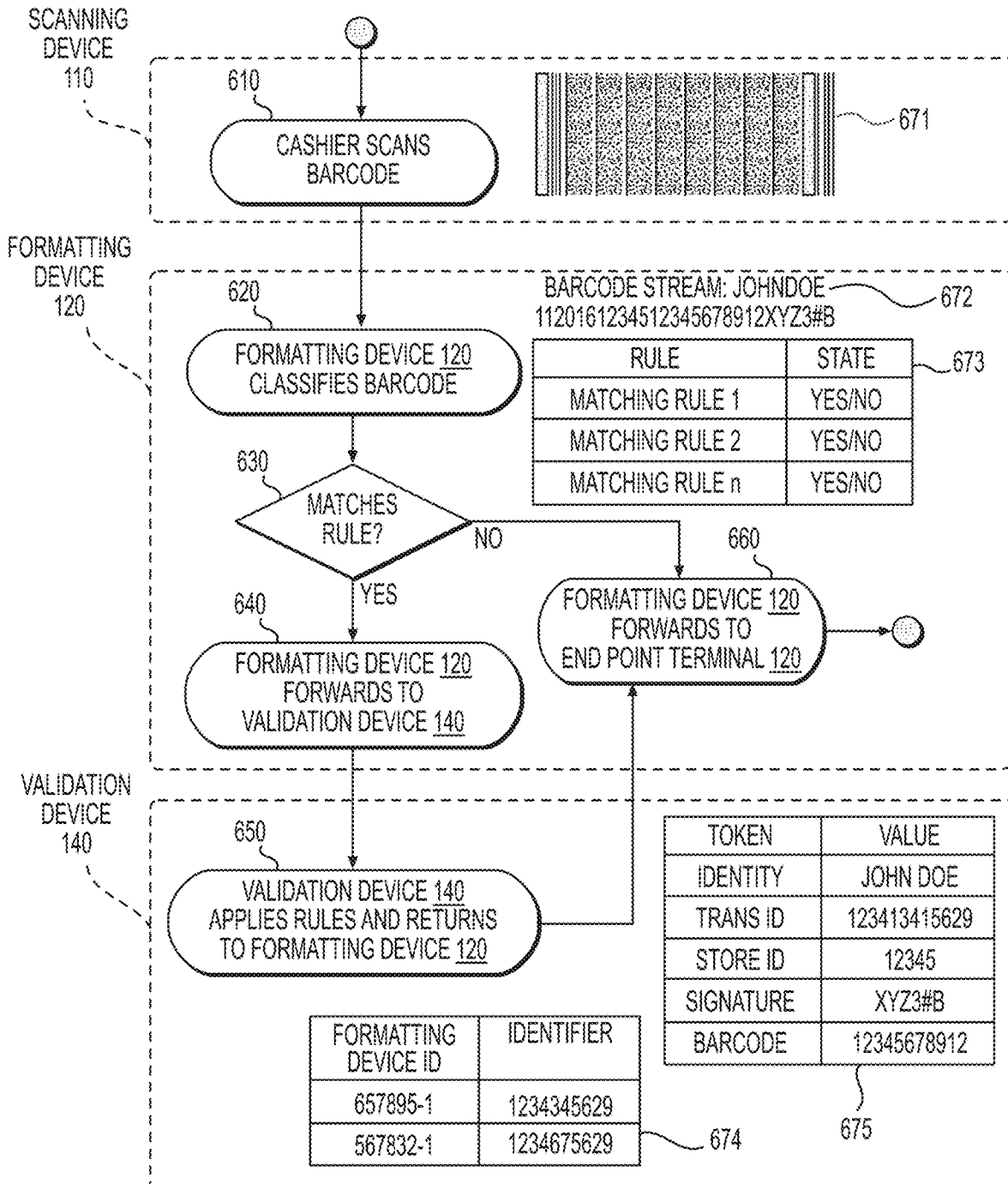
FIG. 6 is a flowchart diagram illustrating a method for validating encoded information according to at least one example embodiment.

FIG. 6 is a flowchart diagram illustrating a method for validating encoded information according to at least one example embodiment. For the sake of clarity, a method related to the retail store/POS terminal context will be discussed, but the example embodiments are not limited thereto, and the operations of the method may be applied to other example embodiments, such as example embodiments related to the document verification context, security context, identity verification context, airport ticketing context, etc.

At operation 610, an operator, such as a cashier, utilizes a scanning device 110, such as a barcode reader, to scan, swipe, and/or otherwise receive a barcode 671, i.e., the encoded information. Next, in operation 620, the scanning device 110 transmits the scanned barcode 671 to the formatting device 120. The formatting device 120 transforms and/or formats the scanned barcode 671 into a barcode data stream 672 compatible with the end point terminal 130 by decoding the information encoded in the barcode 671. The data stream 672 includes the information originally stored in the barcode 671, as well as additional information for use by the validation device 140. For example, the information decoded from the scanned barcode 671 and stored in the barcode data stream 672 may be an alphanumeric text string "johndoe11201612345123456789l2XYZ3#B". The formatting device 120 then classifies the scanned barcode 671 into at least one classification layer (and/or classification type) of a plurality of classification layers based on attributes extracted from the scanned barcode 671 (e.g., a desired string pattern, the formatting type of the encoded information, the length of the encoded information, an embedded string sequence within a desired location of the encoded information, a desired image embedded in the data stream, and/or other design parameters that may be configurable by the manufacturer, system operator, client, user, etc.). In this example, the "#B" at the end of the data stream 672 text string may be a design parameter attribute that indicates that the data stream is to be classified in the one-time use coupon classification layer.

Next, at operation 630, the formatting device 120 applies a plurality of matching rules or forwarding rules (e.g., matching rules 673) stored on the formatting device 120 based on the classification layer of the data stream 672 to determine the destination of the data stream 672. The matching or forwarding rules may be design parameters that are configurable by the manufacturer, system operator, client, user, etc., that may be based on the validation system configuration, the end point terminal system configuration, client/user demands, etc. In this example, if the formatting device 120 determines that the data stream 672 does not apply to any of the matching rules 673, the formatting device 120 appends a null message to the data stream 672 and transmits the data stream 672 to the end point terminal 130 (operation 660). If the formatting device 120 determines that the data stream 672 does apply to one or more of the matching rules 673, at operation 640 the formatting device 120 will then forward the data stream 672 to the validation device 140. However the example embodiments are not limited thereto, and the destination may be another element of the validation system.

At operation 650, once the validation device 140 receives the data stream 672, the validation device 140 analyzes the data stream 672 using a tokenizer and extracts any additional data embedded within the data stream 672 related to the original barcode 671. For example, the additional data may be an identifier, a name, a username, a transaction id, a serial number, a store id, an electronic signature, a security signature, a barcode, an address, a transaction amount, a discount amount, an expiration date, usage policy for the encoded information, a time range for validity, special validity instructions, biometric information, seat number, gate number, flight number, etc., that is parsed from the data stream 672 by the tokenizer. The tokenized information may be stored in a database table, such as database table 675, on the validation device 140. The validation device 140 may also store validation transaction information related to the scanning of the encoded information 671 in a transaction database table 674 stored on the validation device 140. The transaction database table 674 may include information such as the unique identifier for the formatting device 120 that transmitted the data stream 672 to the validation device 140, the identifier associated with the data stream 672 (e.g., the alphanumeric string represented by the barcode 671), the results of the validation of the data stream 672, the time that the data stream 672 was scanned by the scanning device 610, the classification layer of the data stream 672, a link to the related database table entry in the tokenized information database 675, information related to the store/location that the validation device is associated with, information regarding the product, service, operation associated with the validation operation (e.g., the name of the product being sold, the manufacturer of the product, etc.), and/or other data. Once the validation device 140 tokenizes the additional embedded information stored in the data stream 672, the validation device 140 will apply validation rules to the data stream 672, including any usage policies associated with the data stream 672, such as time/date restrictions to the usage of the encoded information, one-time use restrictions, frequency of use restrictions, age restrictions, identification verification restrictions, store restrictions (e.g., coupons that may only be valid at desired store locations), location restrictions (e.g., geographical location restrictions), minimum/maximum discount amount restrictions, access restrictions (e.g., restrictions on the offices/floors/areas of a building that the user may have access to, restrictions to the computers, networks, files, equipment, etc. a user has access to, etc.), and the like, and determine a response based on the results of the validation determination. The validation device 140 will then modify the data stream 672 to include the determined response, such as the results of the validation determination, message regarding the validation status of the encoded information, and/or include instructions for the terminal operator (e.g., process the encoded information manually, apply extra security measures, contact security, contact law enforcement, etc.). In at least one example embodiment, the modification of the data stream 672 may include the validation device 140 initiating and executing the tokenizer to insert or append a desired and/or predetermined token into the data stream 672, and then inserting and/or appending the determined response. The token is configured to act as a trigger for the end point terminal 130 and indicates that information, data, and/or messages related to the validation system is included in the modified data stream 672 and will cause the end point terminal 130 to analyze, process, and execute the modified data stream 672 accordingly. The validation device 140 will then transmit the modified data stream 672 to the formatting device 120.

In operation 660, the formatting device 120 transmits the data stream 672 to the appropriate end point terminal 130. Once the data stream 672 is received by the end point terminal 130, the data stream 672 is analyzed and processed. In at least one example embodiment, the contents of the original encoded information, the results of the validation determination, the message regarding the validation status, and/or instructions for end point terminal operator are extracted from the data stream 672. For example, the original encoded information may be maintained as originally received by the scanning device 110, and the results of the validation determination, message regarding the validation status, and the instructions for the operator may be encoded using the same barcode system that the end point terminal 130 is configured to use, such as the message barcoding system that many general purpose POS terminals use. In other example embodiments, the end point terminal 130 is installed with additional computer instructions that configure the end point terminal 130 to properly process the messages encoded the results of the validation determination, message regarding the validation status, and the instructions for the operator. Once the end point terminal extracts and processes the data stream 672, the end point terminal may display on an included display device one or more messages regarding the validation status, instructions for the operator, such as "One-time use barcode already used," "Accept Paper Coupon Manually," "System Error, Barcode rejected," "Contact Law Enforcement," etc. The end point terminal also processes the results of the validation determination, and if the results of the validation determination indicate that the encoded information is valid, will then apply the original encoded information normally (e.g., apply the coupon discount to the item being purchased, grant access to the user to the building, venue, etc.).

Figure 7:
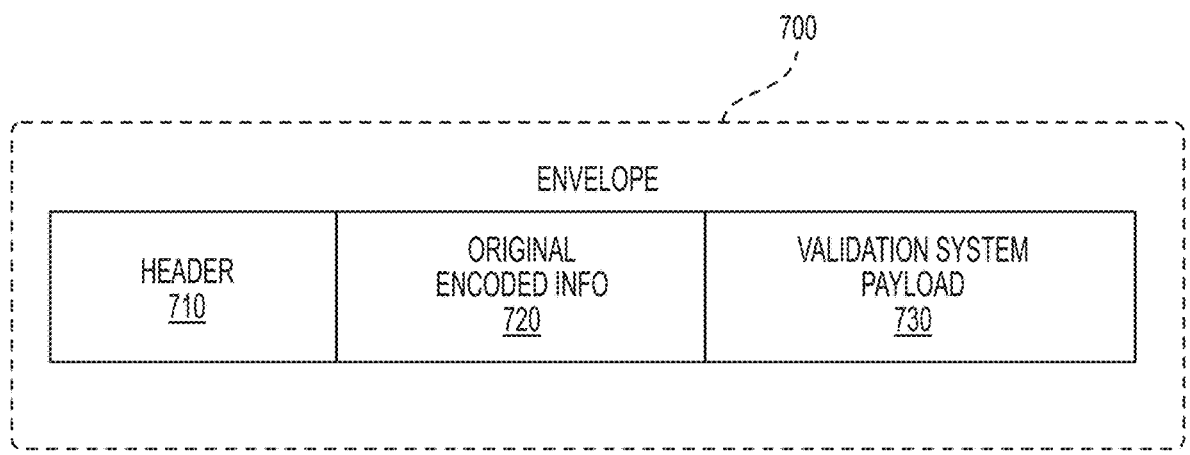
FIG. 7 is a block diagram of a message envelope format for a data stream according to at least one example embodiment.

FIG. 7 is a block diagram of a message envelope for a data stream according to at least one example embodiment. As described above in connection to FIGS. 3 to 6, the formatting device 120 may transform a received encoded information into a data stream 700 that is compatible with the native communication protocol data format of the scanning device 110 and the end point terminal 130, while still including additional information relevant to the validation system. The data stream 700 is formatted as a data message and includes a header section 710 that includes information to identify the data stream 700 as a validation system message, an original encoded information payload 720 that includes the original encoded information (e.g., the scanned barcode, etc.) in a format that complies with and/or is compatible with the native communication protocol data format of the scanning device 110 and the end point terminal 130, thereby ensuring that the data stream 700 can be read by the end point terminal 130. The data stream 700 also includes a validation system payload 730 that may include the validation determination results, additional tokenized information/additional embedded information, a message regarding the validation status of the encoded information, instructions for the terminal operator (e.g., process the encoded information manually, apply extra security measures, contact security, contact law enforcement, etc.), and/or additional metadata, etc. Additionally, according to some example embodiments, the data stream 700 may be packaged in an appropriate communication envelope, such as a TCP/IP envelope, etc., and/or based on an encoded information envelope, such as PDF 417 barcode, Code 128C barcode, etc., based on the communication protocol used between the formatting device 120, the validation device 140, and/or the cloud server/platform server.

FIGS. 8A to 8E are flowchart diagrams illustrating the transmission of messages between the elements of the validation system according to some example embodiments.

Figure 8A:
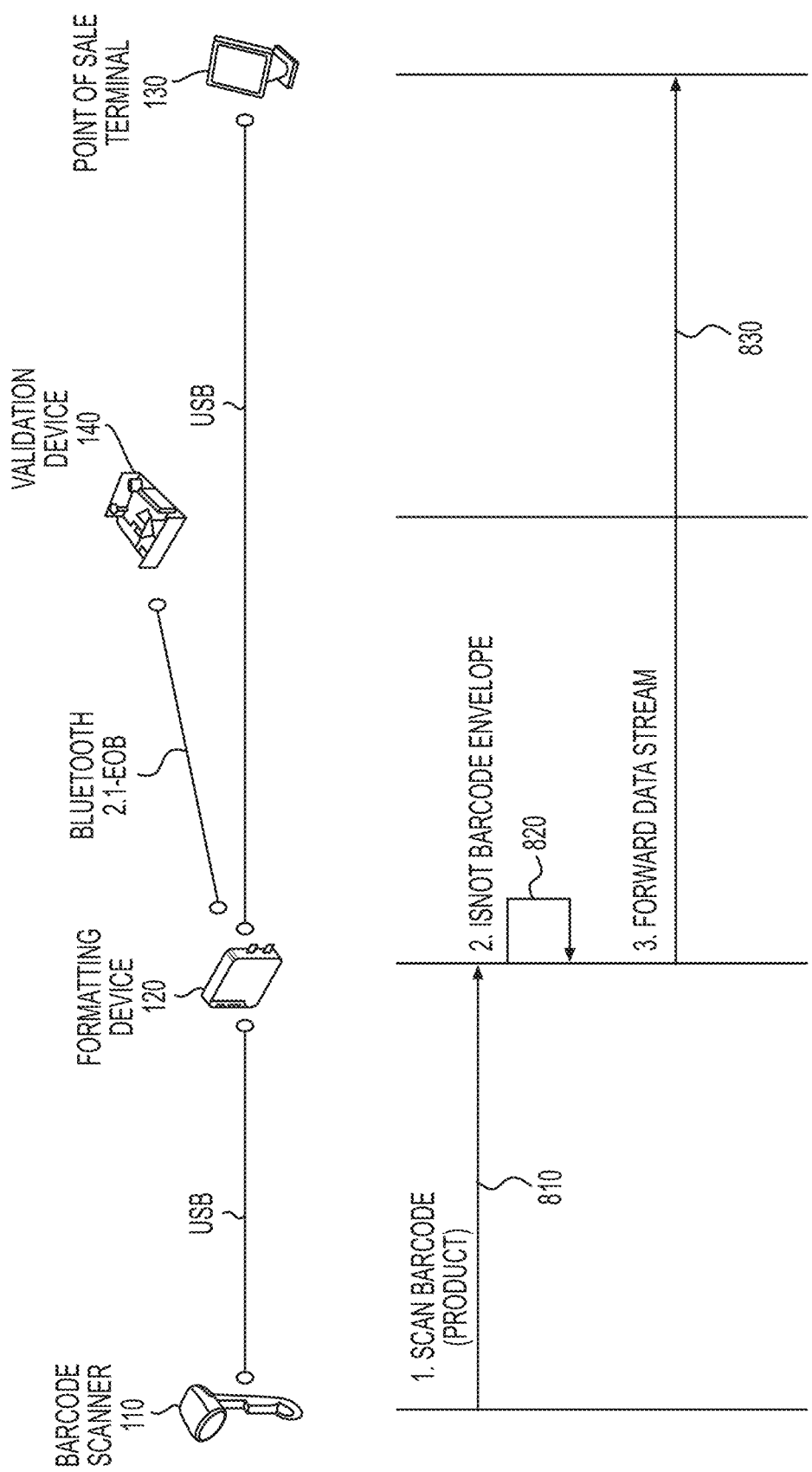
FIGS. 8A, 8B, 8C, 8D, and 8E are flowchart diagrams illustrating the transmission of messages between the elements of a encoded information validation system according to some example embodiments.

According to the example embodiment illustrated in FIG. 8A, in operation 810 a retail product's barcode is scanned by the barcode scanner 110 and is transmitted to the formatting device 120. In operation 820, the formatting device 120 analyzes the scanned barcode and determines that the barcode is unknown. The formatting device 120 then applies the appropriate classification layer to the barcode, transforms the barcode into a data stream envelope that includes the original barcode and then determines that the destination is the POS terminal 130 based on the forwarding rules. In some example embodiments, the formatting device 120 may also include a message indicating that the barcode is unknown, include a null character (or other special character or code) to indicate that the barcode is unknown, or include no message at all. In operation 830, the POS terminal 130 receives the data stream and processes and/or applies the barcode normally, as if the barcode had been transmitted directly from the barcode scanner 110 to the POS terminal 130.

Figure 8B:
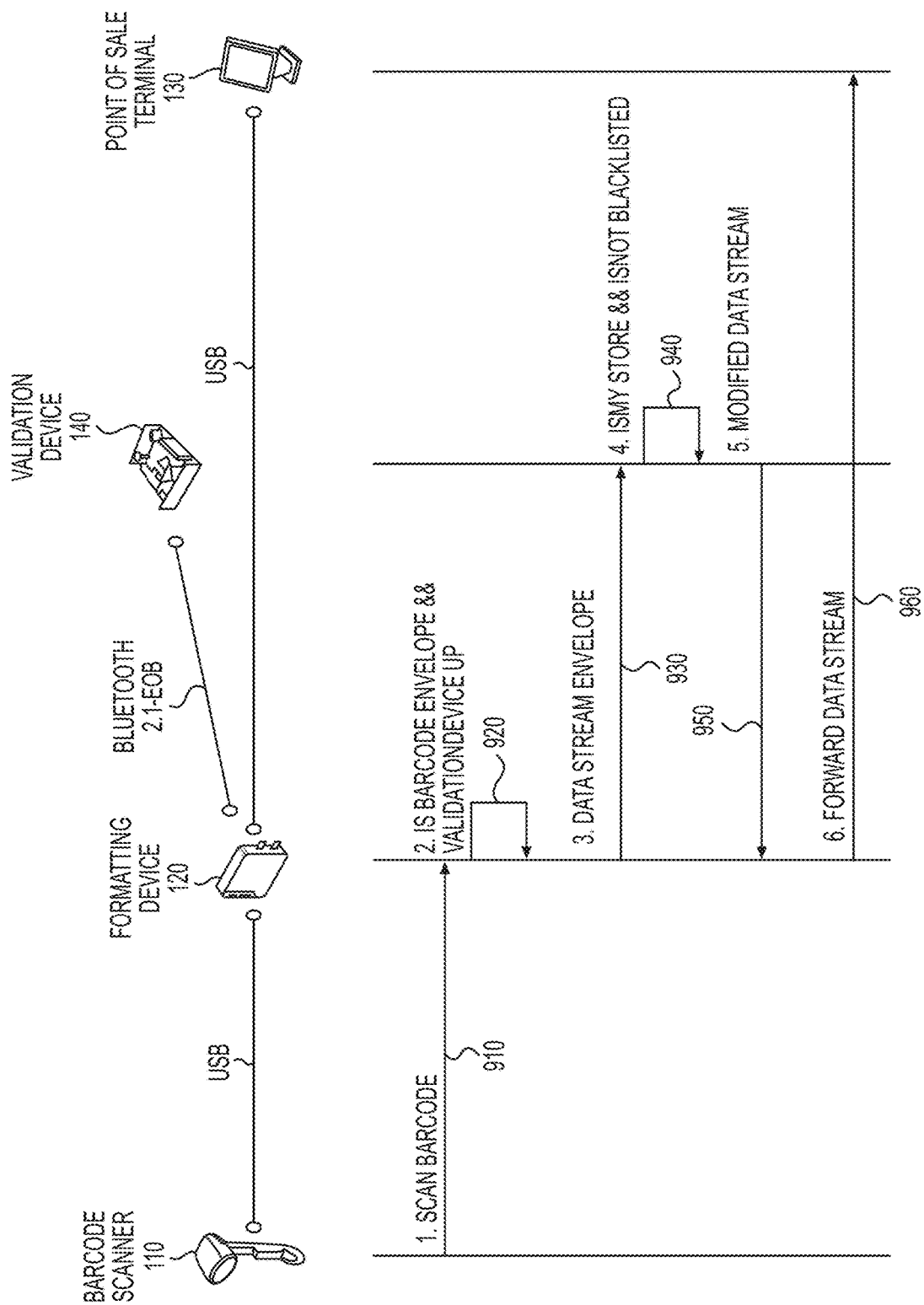

According to another example embodiment illustrated in FIG. 8B, in operation 910, the barcode scanner 110 may scan the barcode for a one-time use coupon and transmit the barcode to the formatting device 120. In operation 920, the formatting device 120 analyzes the scanned barcode and determines that the barcode is a one-time use coupon. The formatting device 120 then applies the appropriate classification layer to the barcode, transforms the barcode into a data stream envelope that includes the original barcode and at least a message indicating that the barcode is a one-time use coupon, and then determines that the destination is the validation device 140 based on the forwarding rules. If the destination is the validation device 140, the formatting device 120 also determines whether the validation device 140 is operating correctly (e.g., whether the validation device 140 is receiving network transmissions). In operation 930, the data stream is transmitted by the formatting device 120 to the validation device 140. In operation 940, the validation device 140 then checks the database table to determine whether the barcode is valid by applying such validation rules as, for example, determining whether the barcode associated with the one-time use coupon has been previously used, determining whether the store that the validation device is installed at is a valid participating store, determining whether the user presenting the one-time use coupon has been blacklisted, etc., and updates the database with the results of the validity determination. According to some example embodiments, the validation device may also detect the specific location (e.g., the location of the validation device and/or the formatting device that receives the encoded information, the location of a mobile device of the user (such as a user's smartphone or wearable device, etc.) that is used to transmit the encoded information to the validation system, etc.) that the encoded information is being validated and may validate the encoded information based on the validation location. For example, a one-time use coupon may be restricted to a single particular store location, a sporting event ticket may only provide access to a particular gate, a security badge may be restricted for use to a particular door, etc.

In operation 950, the validation device 140 then modifies the data stream to include the results of the validation determination and additional messages, metadata, etc., and transmits the modified data stream to the formatting device 120. In operation 960, the formatting device 120 forwards the modified data stream to the POS terminal 130, in this example including a message indicating that the one-time use coupon is valid. The POS terminal 130 then processes and/or applies the barcode normally, as if the barcode had been transmitted directly from the barcode scanner 110 to the POS terminal 130.

Figure 8C:
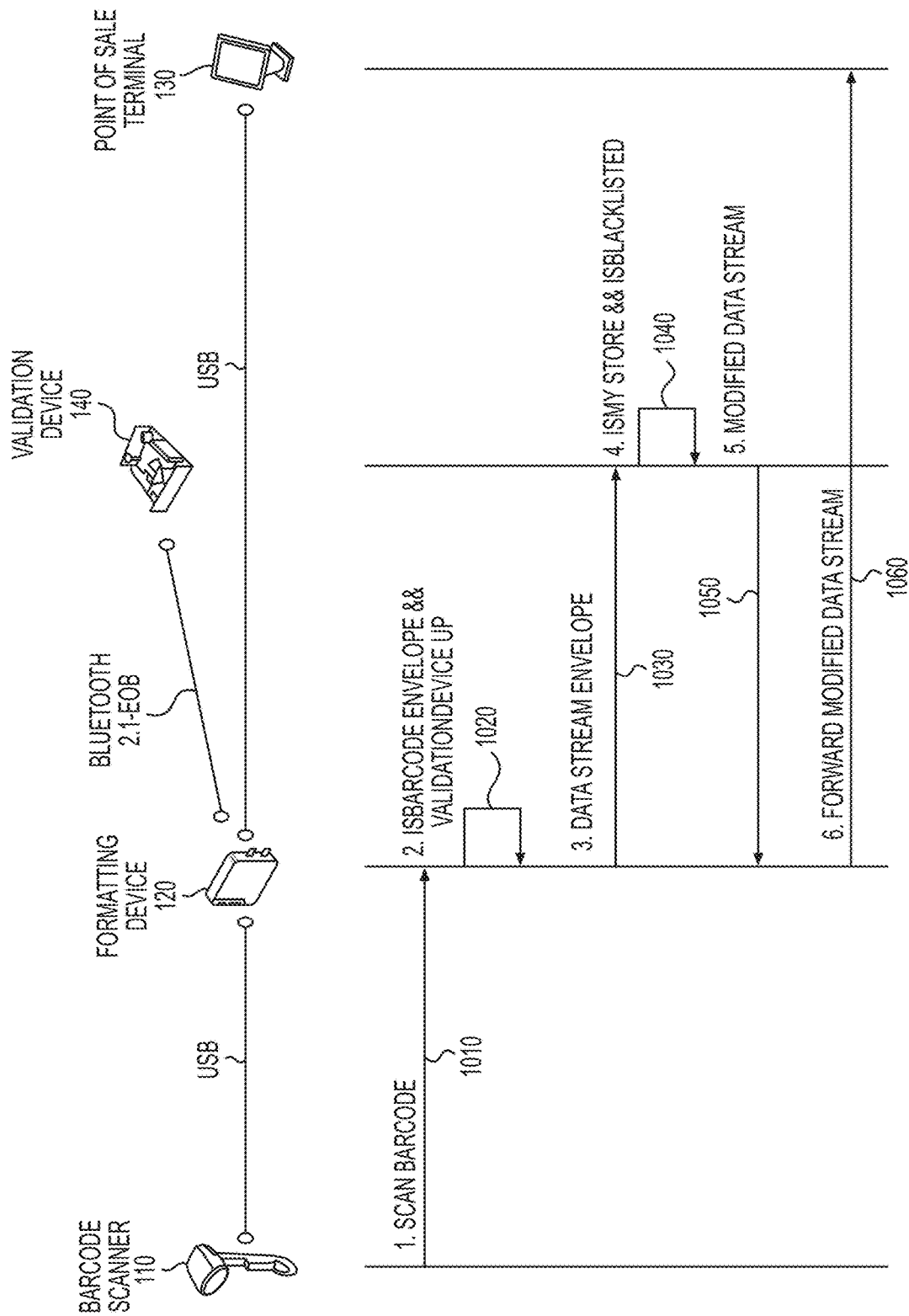

According to another example embodiment illustrated in FIG. 8C, in operation 1010, the barcode scanner 110 may scan the barcode for a one-time use coupon and transmit the barcode to the formatting device 120. In operation 1020, the formatting device 120 analyzes the scanned barcode and determines that the barcode is a one-time use coupon. The formatting device 120 then applies the appropriate classification layer to the barcode, transforms the barcode into a data stream envelope that includes the original barcode and at least a message indicating that the barcode is a one-time use coupon, and then determines that the destination is the validation device 140 based on the forwarding rules. If the destination is the validation device 140, the formatting device 120 also determines whether the validation device 140 is operating correctly (e.g., whether the validation device 140 is receiving network transmissions). In operation 1030, the data stream is transmitted by the formatting device 120 to the validation device 140. In operation 1040, the validation device 140 then checks the database table to determine whether the barcode is valid by applying such validation rules as, for example, determining whether the barcode associated with the one-time use coupon has been previously used, determining whether the store that the validation device is installed at is a valid participating store, determining whether the user presenting the one-time use coupon has been blacklisted, etc., and updates the database with the results of the validity determination. In operation 1050, the validation device 140 then modifies the data stream to include the results of the validation determination and additional messages, metadata, etc., and transmits the modified data stream to the formatting device 120. In operation 1060, the formatting device 120 forwards the modified data stream, which in this example also includes a message indicating that the one-time use coupon is invalid, to the POS terminal 130, which receives the data stream and displays the message indicating that the coupon is invalid and blocking the processing of the one-time use coupon.

Figure 8D:
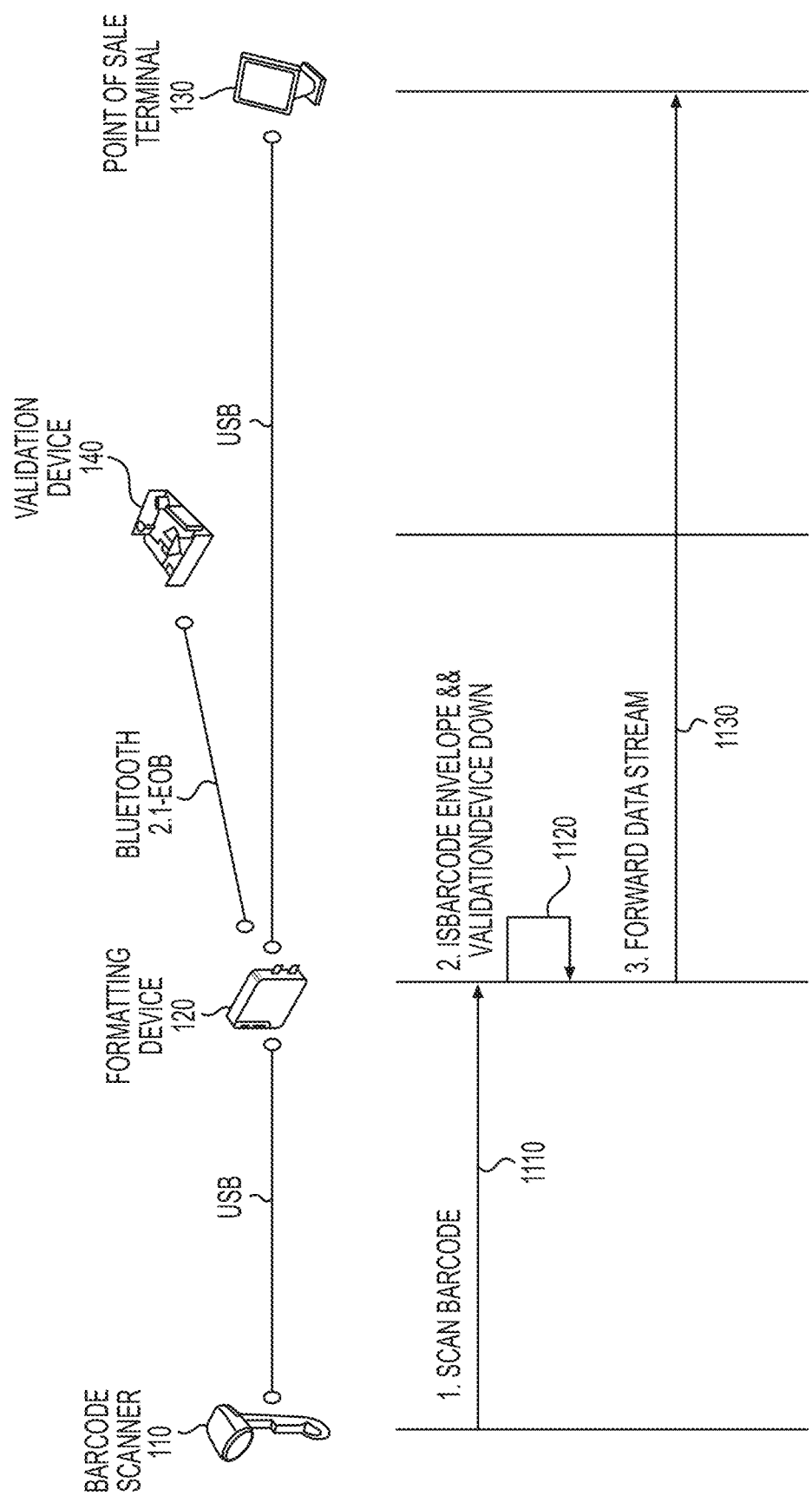

According to another example embodiment illustrated in FIG. 8D, in operation 1110, the barcode scanner 110 may scan the barcode for a one-time use coupon and transmit the barcode to the formatting device 120. In operation 1120, the formatting device 120 analyzes the scanned barcode and determines that the barcode is a one-time use coupon. The formatting device 120 then applies the appropriate classification layer to the barcode, transforms the barcode into a data stream envelope that includes the original barcode and at least a message indicating that the barcode is a one-time use coupon, and then determines that the destination is the validation device 140 based on the forwarding rules. If the destination is the validation device 140, the formatting device 120 also determines whether the validation device 140 is operating correctly (e.g., whether the validation device 140 is receiving network transmissions). However, in this example, the formatting device 120 also determines that communication with the validation device 140 is not possible (e.g., due to the failure of the validation device, network issues, etc.), so therefore the appropriate destination is determined to be POS terminal 130. The data stream is then modified to include an error message indicating that the validation device 140 is not operating correctly. In operation 1130, the formatting device 120 forwards the data stream to the POS terminal 130 for processing and/or application of the one-time use barcode as normal, the POS terminal 130 also displaying to the operator the error message indicating that the validation device 140 is not operating correctly.

Figure 8E:
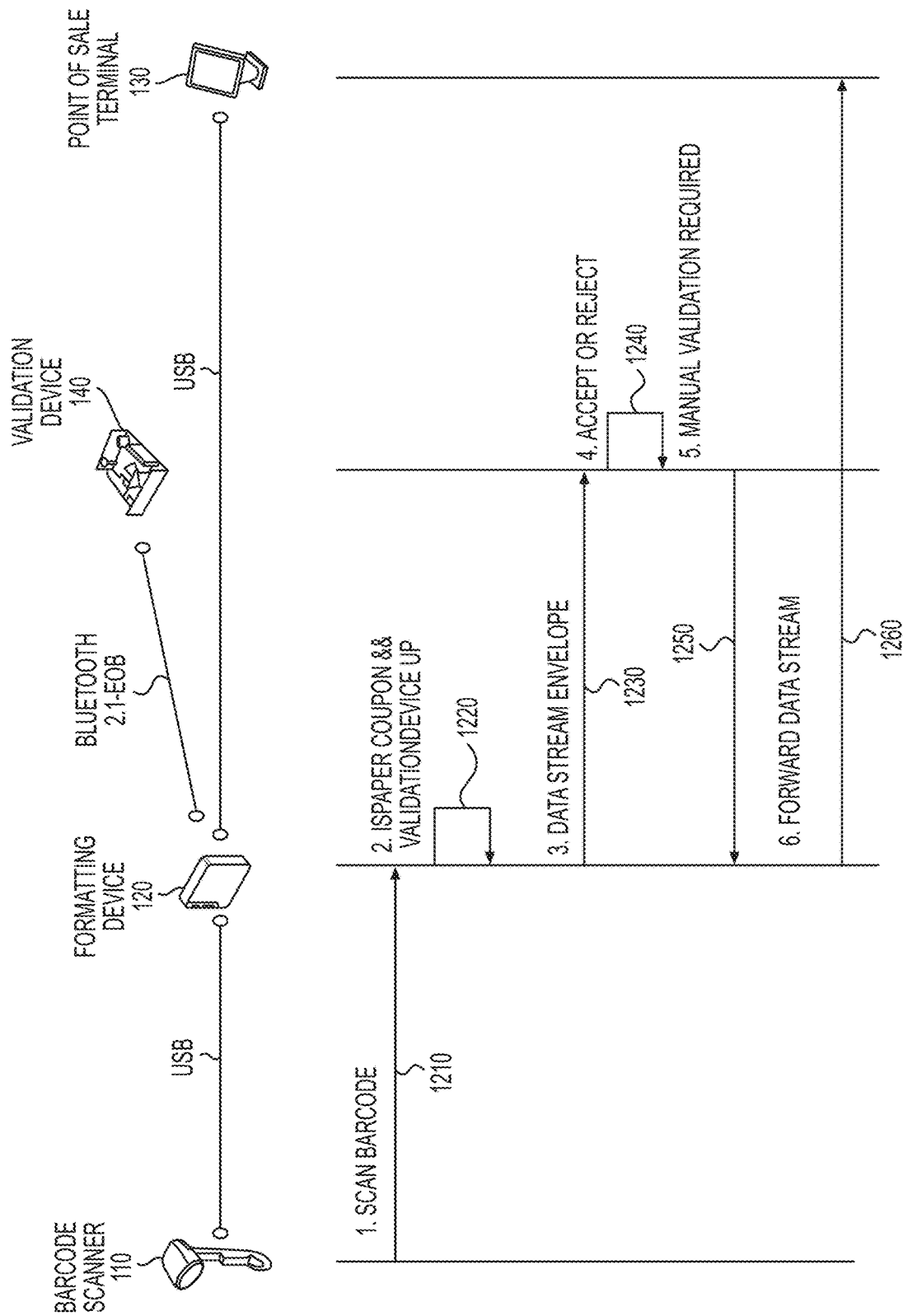

According to another example embodiment illustrated in FIG. 8E, in operation 1210, the barcode scanner 110 scans the barcode for a paper coupon and transmits the barcode to the formatting device 120. In operation 1220, the formatting device 120 analyzes the scanned barcode and determines that the barcode is a paper coupon. The formatting device 120 then applies the appropriate classification layer to the barcode, transforms the barcode into a data stream envelope that includes the original barcode and at least a message indicating that the barcode is a paper coupon, and then determines that the destination is the validation device 140 based on the forwarding rules. If the destination is the validation device 140, the formatting device 120 also determines whether the validation device 140 is operating correctly (e.g., whether the validation device 140 is receiving network transmissions). In operation 1230, the data stream is transmitted by the formatting device 120 to the validation device 140. In operation 1240, the validation device 140 then checks the database table to determine whether the barcode is valid by applying such validation rules as, for example, determining whether the barcode associated with the one-time use coupon has been previously used, determining whether the store that the validation device is installed at is a valid participating store, determining whether the user presenting the one-time use coupon has been blacklisted, etc., and updates the database with the results of the validity determination. In this example, the validation device 140 determines that paper coupons are to be handled manually by the POS terminal operator. In operation 1250, the validation device 140 then modifies the data stream to include the results of the validation determination and additional messages, metadata, etc., such as the operator instruction message indicating that the paper coupon must be handled manually, and transmits the modified data stream to the formatting device 120. In operation 1260, the formatting device 120 forwards the modified data stream, which in this example includes the instruction message indicating that the paper coupon must be handled manually by the POS terminal operator, to the POS terminal 130. The POS terminal 130 then displays the instruction message to the operator.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A validation device comprising:
a memory configured to store computer readable instructions; and
at least one processor configured to execute computer readable instructions to cause the device to, receive encoded information scanned from a product using a scanning device, the encoded information including at least one unique ID, determine a validation rule set associated with the product based on the at least one unique ID, determine whether the product is authentic using the determined validation rule set, modify the encoded information based on results of the product authentication, and transmit the modified encoded information to at least one terminal.

2. The device of claim 1, wherein the encoded information is included in at least one of:

a barcode, a quick response (QR) code, a radio frequency identification (RFID) chip, a near field communication (NFC) chip, a desired hologram, a unique image, unique audible signals, a magnetic strip, infra-red (IR) ink, ultra-violet (UV) ink, or any combinations thereof.

3. The device of claim 1, wherein the scanning device is at least one of:

a barcode reader, a RFID scanner, an image scanner, an IR scanner, a UV scanner, a NFC scanner, a camera, or any combinations thereof.

4. The device of claim 1, wherein the at least one terminal is at least one of, a point-of-sale terminal, a computer terminal, a server, a smartphone, a tablet, or any combinations thereof.

5. The device of claim 1, wherein the at least one processor is further configured to execute the computer readable instructions to cause the device to:

transmit at least one of multimedia content, personalized content, security alerts, or any combinations thereof to a user device.

6. The device of claim 1, wherein the received encoded information is encrypted using a first encryption key;

the memory is further configured to store a first decryption key associated with the first encryption key; and the at least one processor is further configured to execute the computer readable instructions to cause the device to decrypt the received encoded information using the first decryption key.

7. The device of claim 1, wherein the memory is further configured to store usage history information in association with a plurality of unique IDs, the plurality of unique IDs including the at least one unique ID; and the at least one processor is further configured to execute the computer readable instructions to cause the device to, associate the results of the determining with the at least one unique ID in the memory; and update the usage history information of the at least one unique ID in the memory.

8. The device of claim 7, wherein the at least one processor is further configured to execute the computer readable instructions to cause the device to:

transmit the at least one unique ID, the results of the determining, and the usage history information to a remote server.

9. The device of claim 7, wherein the at least one processor is further configured to execute the computer readable instructions to cause the device to:

update contents of the memory based on information received from a remote server, the updating including updating the usage history information associated with the plurality of unique IDs.

10. The device of claim 7, wherein the at least one processor is further configured to execute the computer readable instructions to cause the device to, extract usage restriction information from the received encoded information; and determine whether the product is authentic based on the usage restriction information and the stored usage history information.

11. A non-transitory computer readable medium storing computer readable instructions, which when executed by at least one processor, causes the at least one processor to:

receive encoded information scanned from a product using a scanning device, the encoded information including at least one unique ID, determine a validation rule set associated with the product based on the at least one unique ID, determine whether the product is authentic using the determined validation rule set, modify the received encoded information based on results of the product authentication, and transmit the modified encoded information to at least one terminal.

12. The non-transitory computer readable medium of claim 11, wherein the encoded information is included in at least one of:

a barcode, a quick response (QR) code, a radio frequency identification (RFID) chip, a near field communication (NFC) chip, a desired hologram, a unique image, unique audible signals, a magnetic strip, infra-red (IR) ink, ultra-violet (UV) ink, or any combinations thereof.

13. The non-transitory computer readable medium of claim 11, wherein the scanning device is at least one of:

a barcode reader, a RFID scanner, an image scanner, an IR scanner, a UV scanner, a NFC scanner, a camera, or any combinations thereof.

14. The non-transitory computer readable medium of claim 11, wherein the at least one terminal is at least one of, a point-of-sale terminal, a computer terminal, a server, a smartphone, a tablet, or any combinations thereof.

15. The non-transitory computer readable medium of claim 11, wherein the at least one processor is further caused to:

transmit at least one of multimedia content, personalized content, security alerts, or any combinations thereof to a user device.

16. The non-transitory computer readable medium of claim 11, wherein the received encoded information is encrypted using a first encryption key; and the at least one processor is further caused to decrypt the received encoded information using a first decryption key associated with the first encryption key.

17. The non-transitory computer readable medium of claim 11, wherein the at least one processor is further caused to:

store usage history information in association with a plurality of unique IDs, the plurality of unique IDs including the at least one unique ID in memory;

associate the results of the determining with the at least one unique ID in the memory; and update the usage history information of the at least one unique ID in the memory.

18. The non-transitory computer readable medium of claim 17, wherein the at least one processor is further caused to:

transmit the at least one unique ID, the results of the determining, and the usage history information to a remote server.

19. The non-transitory computer readable medium of claim 17, wherein the at least one processor is further caused to:
update contents of the memory based on information received from a remote server, the updating including updating the usage history information associated with the plurality of unique IDs.

20. The non-transitory computer readable medium of claim 17, wherein the at least one processor is further caused to:
extract usage restriction information from the received encoded information; and
determine whether the product is authentic based on the usage restriction information and the stored usage history information.

\* \* \* \* \*